(12) United States Patent
Benz et al.

(10) Patent No.: US 11,750,520 B2
(45) Date of Patent: Sep. 5, 2023

(54) HASH TAG LOAD BALANCING

(71) Applicant: Endace Technology Limited, Hamilton (NZ)

(72) Inventors: Karsten Benz, Kihikii (NZ); Peter Toth, Auckland (NZ); Stuart Wilson, Hamilton (NZ); Boanerges Bruno, Woodland Hills, CA (US)

(73) Assignee: Endace Technology Limited, Hamilton (NZ)

( * ) Notice: Subject to any disclaimer, the term of this patent is extended or adjusted under 35 U.S.C. 154(b) by 0 days.

(21) Appl. No.: 17/021,317

(22) Filed: Sep. 15, 2020

(65) Prior Publication Data

US 2021/0105211 A1  Apr. 8, 2021

Related U.S. Application Data

(63) Continuation of application No. 15/968,740, filed on May 1, 2018, now Pat. No. 10,778,587, which is a continuation of application No. 14/459,748, filed on Aug. 14, 2014, now Pat. No. 10,050,885.

(60) Provisional application No. 61/973,828, filed on Apr. 1, 2014.

(51) Int. Cl.
*H04L 47/125* (2022.01)
*H04L 47/50* (2022.01)
*H04L 9/40* (2022.01)

(52) U.S. Cl.
CPC ............ *H04L 47/125* (2013.01); *H04L 47/50* (2013.01); *H04L 63/0236* (2013.01)

(58) Field of Classification Search
None
See application file for complete search history.

(56) References Cited

U.S. PATENT DOCUMENTS

| 2008/0320003 | A1* | 12/2008 | Heinson | H04L 61/1552 |
| 2013/0262703 | A1* | 10/2013 | Dong | H04L 47/38 709/247 |
| 2014/0059200 | A1* | 2/2014 | Nguyen | H04L 43/026 709/224 |
| 2015/0244580 | A1* | 8/2015 | Saavedra | H04L 45/245 709/221 |

(Continued)

FOREIGN PATENT DOCUMENTS

| JP | 2013175939 A | * | 9/2013 | |
| WO | WO-2013070631 A | * | 5/2013 | H04L 43/16 |

*Primary Examiner* — Rebecca E Song
(74) *Attorney, Agent, or Firm* — Alford Law Group, Inc.; Tobi C. Clinton

(57) ABSTRACT

A netflow generator appliance is provided. The netflow generator appliance is configured to perform operations, including receiving a plurality of netflow records at a netflow generator appliance, each netflow record including at least a hash tag; converting a first hash tag of the first netflow record into a first percentage based on a load balancing function; based on the first percentage, storing the first netflow record in a first queue of data that are scheduled to be sent to a first netflow collector; converting a second hash tag of a second netflow record into a second percentage based on the load balancing function, wherein the second percentage differs from the first percentage; and based on the second percentage, storing the second netflow record in a second queue of data that are scheduled to be sent to a second netflow collector.

6 Claims, 18 Drawing Sheets

(56) References Cited

U.S. PATENT DOCUMENTS

2015/0281089 A1\* 10/2015 Marchetti ............ H04L 47/125
370/235

\* cited by examiner

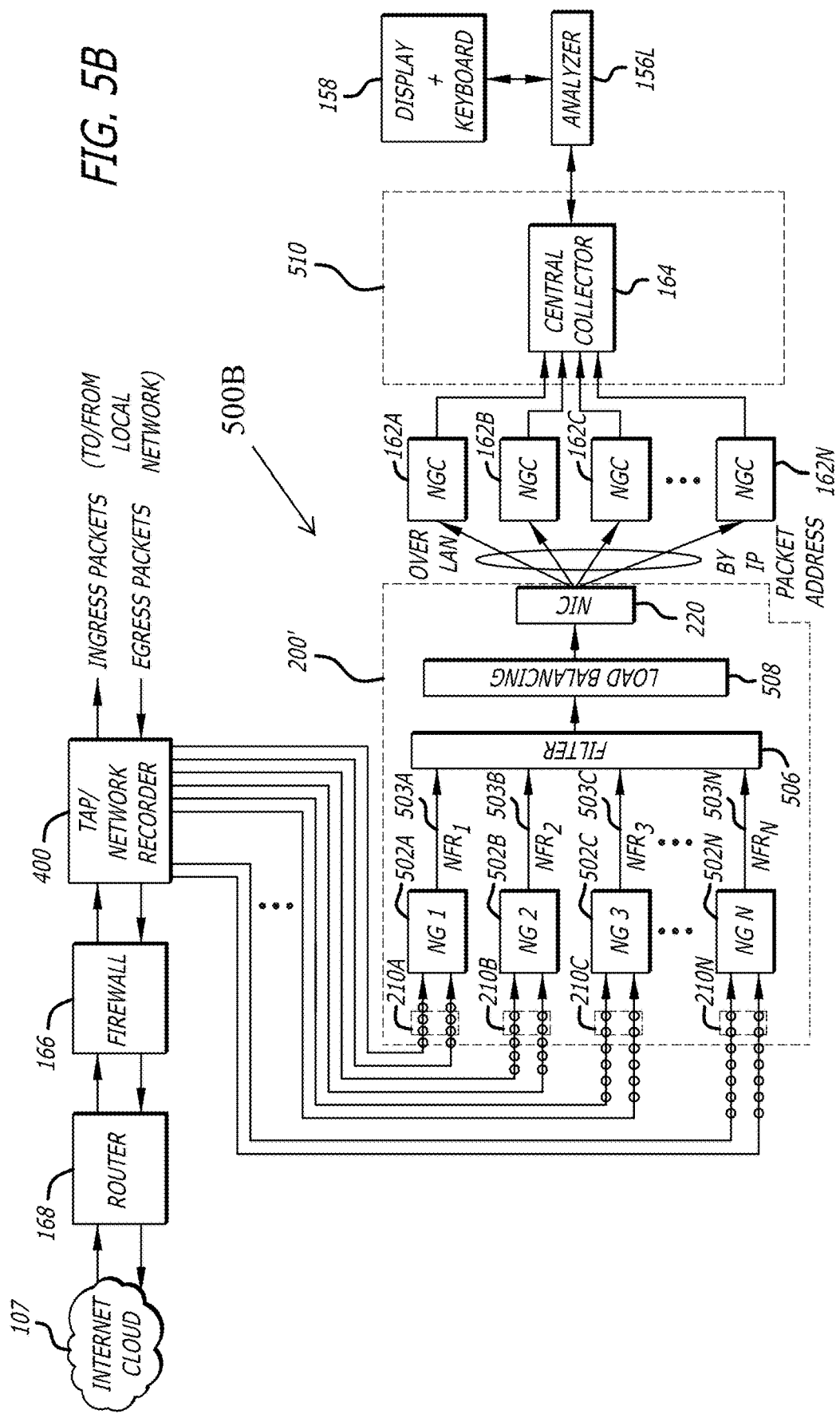

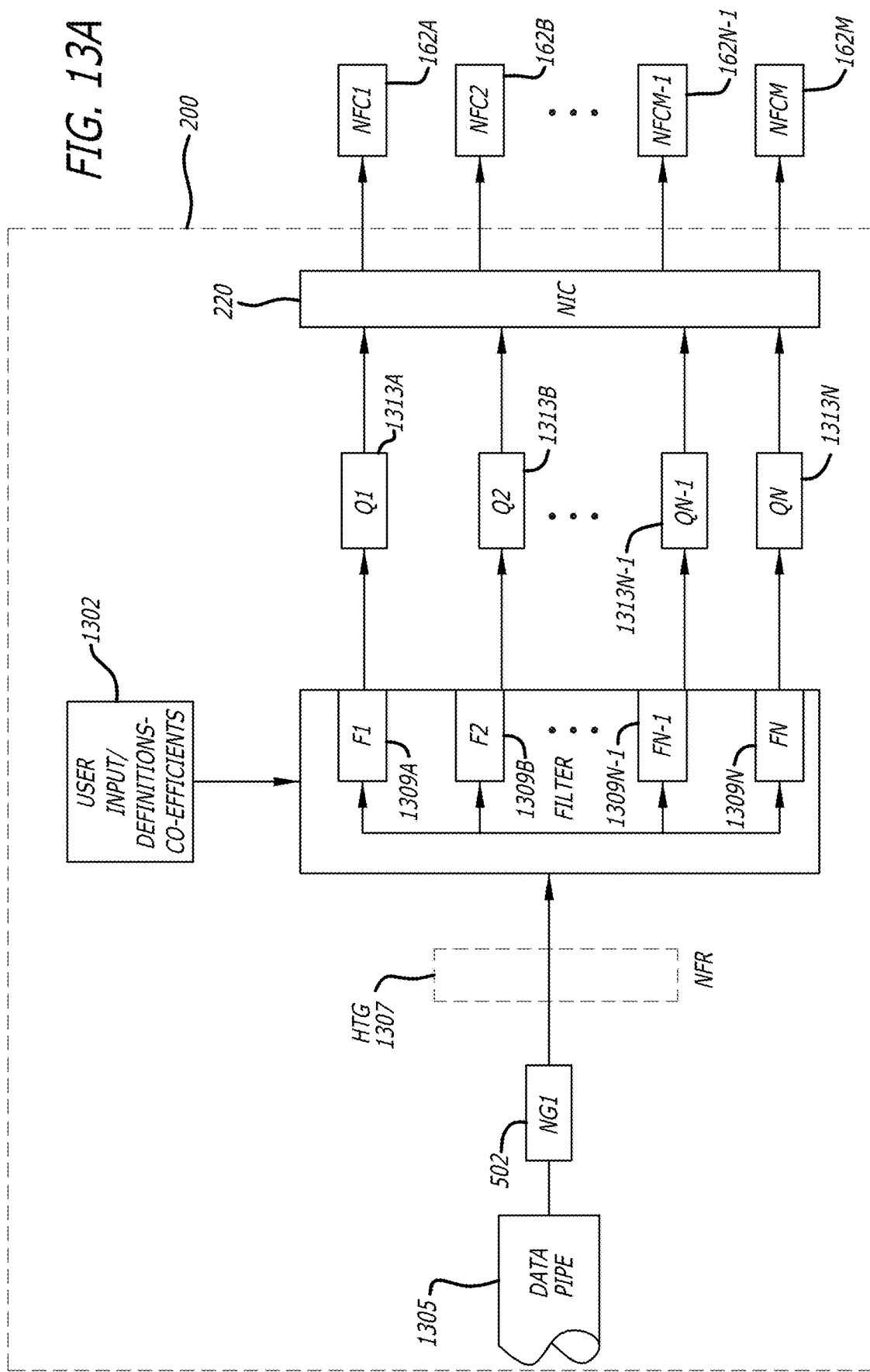

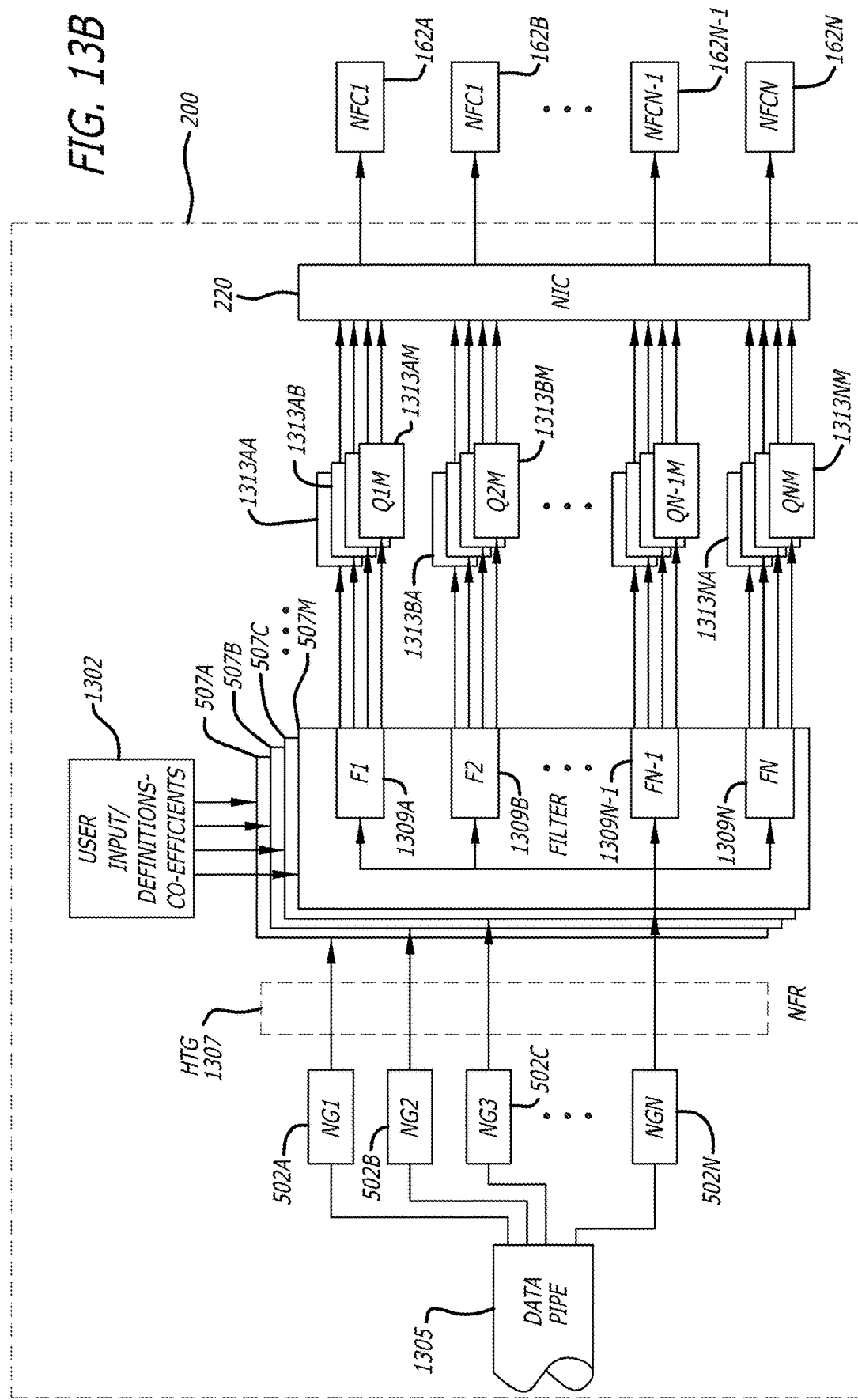

HASH TAG LOAD BALANCING

CROSS REFERENCE

This patent application is a continuation and claims the benefit of U.S. Non-Provisional patent application Ser. No. 15/968,740, entitled HASH TAG LOAD BALANCING filed on May 1, 2018 by inventors Karsten Benz et al. U.S. Non-Provisional patent application Ser. No. 15/968,740 is a continuation and claims the benefit of U.S. Non-Provisional patent application Ser. No. 14/459,748, entitled HASH TAG LOAD BALANCING filed on Aug. 14, 2014 by inventors Karsten Benz et al. U.S. Non-Provisional patent application Ser. No. 14/459,748 claims the benefit of U.S. Provisional Patent Application No. 61/973,828, entitled HASH TAG LOAD BALANCING filed on Apr. 1, 2014 by inventors Karsten Benz et al. This patent application and U.S. Non-Provisional patent application Ser. No. 14/459,748 is related to New Zealand Patent Application No. 627953 entitled HASH TAG LOAD BALANCING filed on Jul. 28, 2014 by inventors Karsten Benz et al., that claims priority to U.S. Provisional Patent Application No. 61/973,828 filed on Apr. 1, 2014.

FIELD

The embodiments generally relate to monitoring packet communications between a local area network and a wide area network.

BACKGROUND

Effective computer security strategies integrate network security monitoring: the collection and analysis of data to help a network administrator detect and respond to intrusions. Accordingly, network security and maintenance are not simply about building impenetrable firewalls. Determined attackers will eventually overcome traditional defenses.

The ability to capture and analyze network behavior for incident detection is becoming increasingly challenging. Incident detection is particularly challenging for network and security administrators in which the network is capable of transmitting Ethernet frames or packets at a rate of ten gigabits per second (10 GbE) or higher. Incident detection is also challenging where a network includes a virtual, hybrid, or cloud architecture.

A data center computer network, including a plurality of servers, may support load balancing of the number of clients or the performance of certain functions among multiple servers. For example, if the number of clients on a server begin using substantial processor resources, clients may be moved to another server for client server interaction to load balance the clients across servers. If a functional process is particularly time consuming, one server may be dedicated to that functional process. If a client requests that function from another server, the functional process may be offloaded to that dedicated server for processing in order to load balance the workload across servers in the data center computer network.

The traditional methods of load balancing of clients and functional processes in a data center across multiple servers to support clients are not applicable when analyzing Ethernet packets within the data center computer network.

BRIEF DESCRIPTION OF THE DRAWINGS

Embodiments will be described with reference to the Figures, in which like reference numerals denote like elements and in which:

FIGS. 5A-5B illustrate functional block diagrams to load balance netflow record collection and analysis.

FIGS. 13A-13B illustrate functional block diagrams of hash tag load balancing of netflow records from one or more netflow generators to a plurality of netflow collectors using a filter function, with parallelization to enhance throughput (in comparison to FIG. 8).

DETAILED DESCRIPTION

In the following detailed description of the embodiments, numerous specific details are set forth in order to provide a thorough understanding of the embodiments. However, it will be obvious to one skilled in the art that the embodiments may be practiced without these specific details. In other instances well known methods, procedures, components, and circuits have not been described in detail so as not to unnecessarily obscure aspects of the embodiments.

Introduction

The ability to collect and access packet-level data is important to analyzing the root cause of network issues. However, capturing all of the data packets on high-speed networks can prove to be challenging. To help overcome these issues, netflow generator appliances (NGAs) are provided that include data acquisition and generation (DAG) cards, among other devices. A device is hardware, software, or a combination of hardware and software. The NGAs offer a range of configuration options for data visualization with minimal latency, regardless of packet size, interface type, or network load. In particular, the NGAs use hash tags in a way that simplify a load balancing scheme for monitoring network traffic on a data center. NGAs carry out operations of hash tag load balancing for monitoring traffic on the data center computer network.

The description herein includes a general overview of a data center, the role of NGAs within a data center, a description of a data center capable of filtering and load balancing netflow records, architectures of various devices of the data center, and details of filtering and load balancing operations.

Overview of a Data Center

Figure 1A:
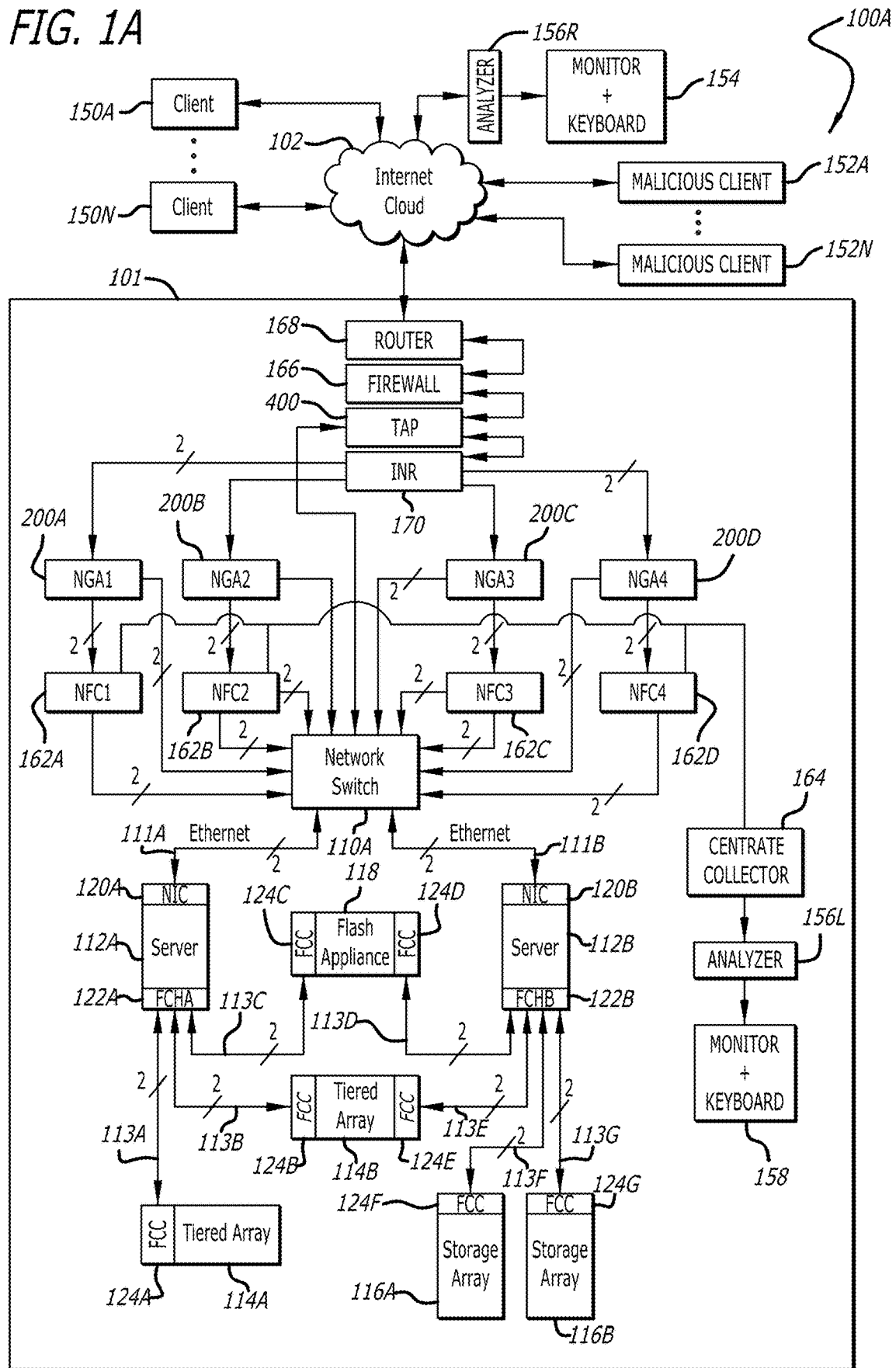
FIG. 1A illustrates a functional Hock diagram of a data center configured for centralized packet capture of ingress and egress Ethernet packets and centralized netflow record collection.

Referring now to FIG. 1A, a block diagram of an exemplary data center computer network 100A is shown. The data center computer network 100A includes, without limitation, a router 168, a firewall 166, a tap 400, a netflow recorder (NR) 170 (e.g., intelligent netflow recorder, INR), netflow generators 200A-200D, netflow collectors (NFCs 162A-162D, a central NFC 164, a network switch 110A, one or more servers 112A-112B, one or more tiered storage appliances 114A-114B, one or more storage array appliances 116A-116B, and one or more flash appliances 118 coupled together by one or more high speed networking cables (e.g., Ethernet 111A-111B, Fibre Channel 113A-113G) to form a local storage area network (LAN) 101.

Each NGA 200A-200D is coupled to the NR 170 to receive ingress and egress Ethernet packets for analysis. Each NGA 200A-200D is further coupled to the network switch 110A so that netflow records may be routed to a plurality of NFCs. Each NFC 162A-162D is also coupled to the network switch 110A and the central NFC 164.

A pair of servers 112A-112B, also referred to as storage initiators, are connected to the network switch 110A via Ethernet cables 111A-111B terminating in Ethernet cards 120A-120B installed on servers 112A-112B. The servers 112A-112B further have Fibre Channel host bus adapter cards 122A-122B respectively installed into them.

In one embodiment, a target network device (also referred to herein as a storage target) includes Fibre Channel cards 124A-124C installed to receive signals, including a storage request, from the servers 112A-112B off of wires or cables, such as Fibre Channel cables 113C-113D. The target network device may be one of the tiered storage arrays 114A-114B, the storage arrays 116A-116B, or the flash appliance 118 (referred to collectively as storage array appliances). Fibre Channel cards 124A, 124B, 124E, 124F, and 124G may be installed in the storage array appliances 114A, 114B, 116A-116B and 118.

The servers 112A-112B have Fibre Channel host bus adapters 122A-122B that are coupled to the Fibre Channel cards 122A-B, 124E-G in the storage array appliances 114A-114B, 116A-116B and 118. The Fibre Channel host adapters 122A-122B may differ somewhat from the Fibre Channel cards 122A-B, 124E-G because the server 112A, 112B is an initiator and the storage array appliances 114A-114B, 116A-116B, 118 are targets.

In some embodiments, the connections between servers 112A-112B and the storage array appliances 114A, 114B, 116A, and 116B are via fiber cables 113A, 113B, 113E, 113F, and 113G that terminate at one end at the Fibre Channel cards 124A, 124B, 124C, 124E, 124F, and 124G of the storage array appliances 114A, 114B, 116A and 116B.

One or more clients 150A-150N may interface with the data center computer network 100A over a wide area network 102, such as the Internet or World Wide Web. The one or more clients 150A-150B may desire one or more server functions of the servers 112A-112B for software applications and/or storage capacity provided by the storage arrays or appliances 114A-114B, 116A-116B, 118 to store data.

Servers/storage arrays in the data center 100A can communicate with the one or more remotely located clients 150A-150N over the WAN 102.

One or more malicious clients 152A-152N may pose a security threat to the data center computer network 100A. Accordingly, a user (e.g., network administrator) can manage security of the data center computer network 100A via tools, such as an analyzer 156L and a management console 158, including a monitor and a keyboard. The analyzer 156L and the management console 158 are coupled to the central NFC 164. Alternatively, the user can manage security of the data center computer network 100A remotely over the Internet cloud 102. For example, the user can manage security of the data center computer network 100A via tools, such as a remote analyzer tool 156R and a remote management console 154, including a monitor and keyboard. The remote analyzer 156R and the remote management console 154 are in communication with the central NFC 164.

Figure 1B:
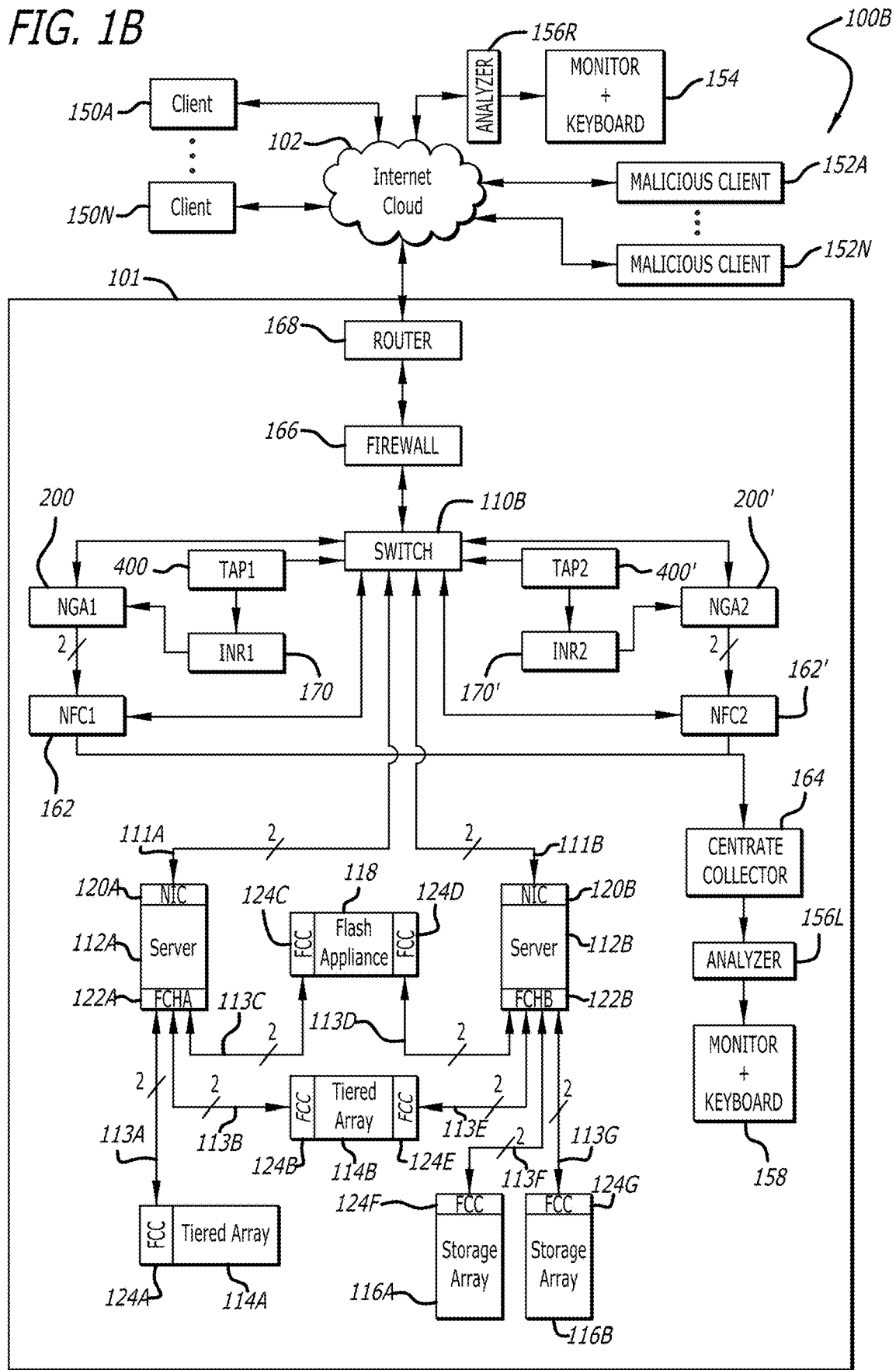
FIG. 1B illustrates a functional block diagram of a data center configured for distributed packet capture of ingress and egress Ethernet packets and centralized netflow record collection.

FIG. 1B is a block diagram of another example data center computer network 100B. The data center computer network 100B is similar to the data center computer network 100A of FIG. 1A. However, the data center computer network 100B of FIG. 1B includes a switch 110B that is located between the firewall 166 and two taps (400 and 400').

Accordingly, the switch 110B is coupled to firewall 166, tap 400, tap 400', NGA 200, and NGA 200'. Tap 400 is also coupled to NR 170 and NR 170'. NGA 200 is also coupled to NR 170 and NFC 162. NGA 200' is also coupled to NR 170' and NFC 162'. NFC 162 and NFC 162' are coupled to the central NFC 164.

Other devices of the data center computer network 100B may be similar to the devices of the data center computer network 100A of FIG. 1A.

Role of Network Generator Appliances (NGAs)

NGAs are a part of a network monitoring infrastructure. NGAs are desirable in network monitoring to avoid having the work load of netflow generation placed upon production routers and switches. The NGAs can facilitate netflow record generation for all data packets, without having to sample a few data packets and drop other data packets in the netflow record generation process.

When generating netflow records for high speed networks that are heavily loaded, there are few netflow collectors (NFCs), if any, that can process netflow records at the generation rate of NGAs in real time. The are a few traditional solutions to the flow rate problem of netflow record generation. Some less desirable solutions include (1) building custom NFCs that can handle large numbers of netflow records; (2) distributing the generated netflow records across large numbers of NFCs; (3) being selective in the netflow records that are generated (e.g., do not send all generated netflow records to the NFCs; send only certain records to certain NFCs); or (4) a hybrid approach of two or more of the preceding solutions. Most organizations with storage area networks do not have the expertise or the desire to create their own netflow collectors, further limiting the possible traditional solutions.

Accordingly, NGAs are provided that are capable of balancing the load across multiple NFCs. The NGA's may additionally filter the generated netflow so netflow records that are of the most interest are forwarded to the NFCs.

The output-filtering feature of the NGAs provides organizations the ability to create custom filters and thus export specific flows to specific NFCs. For example, customers can forward all flows that correspond to a specific source IP to one NFC and can forward all the flows that correspond to a specific destination IP address to another NFC. Accordingly, the NGAs give a customer a tool set to statically load balance the flow traffic across multiple NFCs.

The use of address-based filtering is useful when there is a need to use different metering instances for different traffic. However, address-based filtering can be an awkward method for achieving evenly balanced netflow record loads across multiple NFCs.

Accordingly, in addition to sophisticated filtering, the NGAs can perform hash-based load balancing of netflow records among multiple NFCs with relatively little user configuration required.

The NGAs support multiple metering instances to generate netflow records that comprise a single virtual DAG packet source and multiple processing threads, which allows the amount of traffic that each NGA can process to scale. Each metering instance can then be associated with one or more NFCs.

If a user wishes to send the same netflow records to different NFCs simultaneously, the NGAs can do so, as well as send different formatted netflow records to different NFCs from the same source at the same time. However, such a configuration does not enable the user to balance or manage the load to the NFCs.

In order to be able to manage the load going to each NFC, the NGAs can apply a filter that determines which netflow records are exported to any given NFC. Such a configuration enables the user to configure the system to balance the load going to the NFCs. According to how the user configures the filters, the NGAs can send certain records to certain NFCs, as well as reduce the number of records that the NGAs send to a single NFC to avoid having to scale the NFC infrastructure.

Accordingly, provided here is a description of filtering functionality to reduce the traffic that is being sent from the NGAs to the coupled NFCs. The filters therefore compare each outgoing netflow record with individually configurable filter expressions and when the netflow record matches all of filter expressions, the record is passed on to the designated NFC.

Alternatively load balancing can be achieved through use of hash load balancing (HLB) on the host and splitting the traffic to multiple virtual DAGs. Within the virtual DAGs, metering inputs can route to a different NFC.

Data Center Capable of Filtering and Load Balancing Netflow Records

Figure 5A:
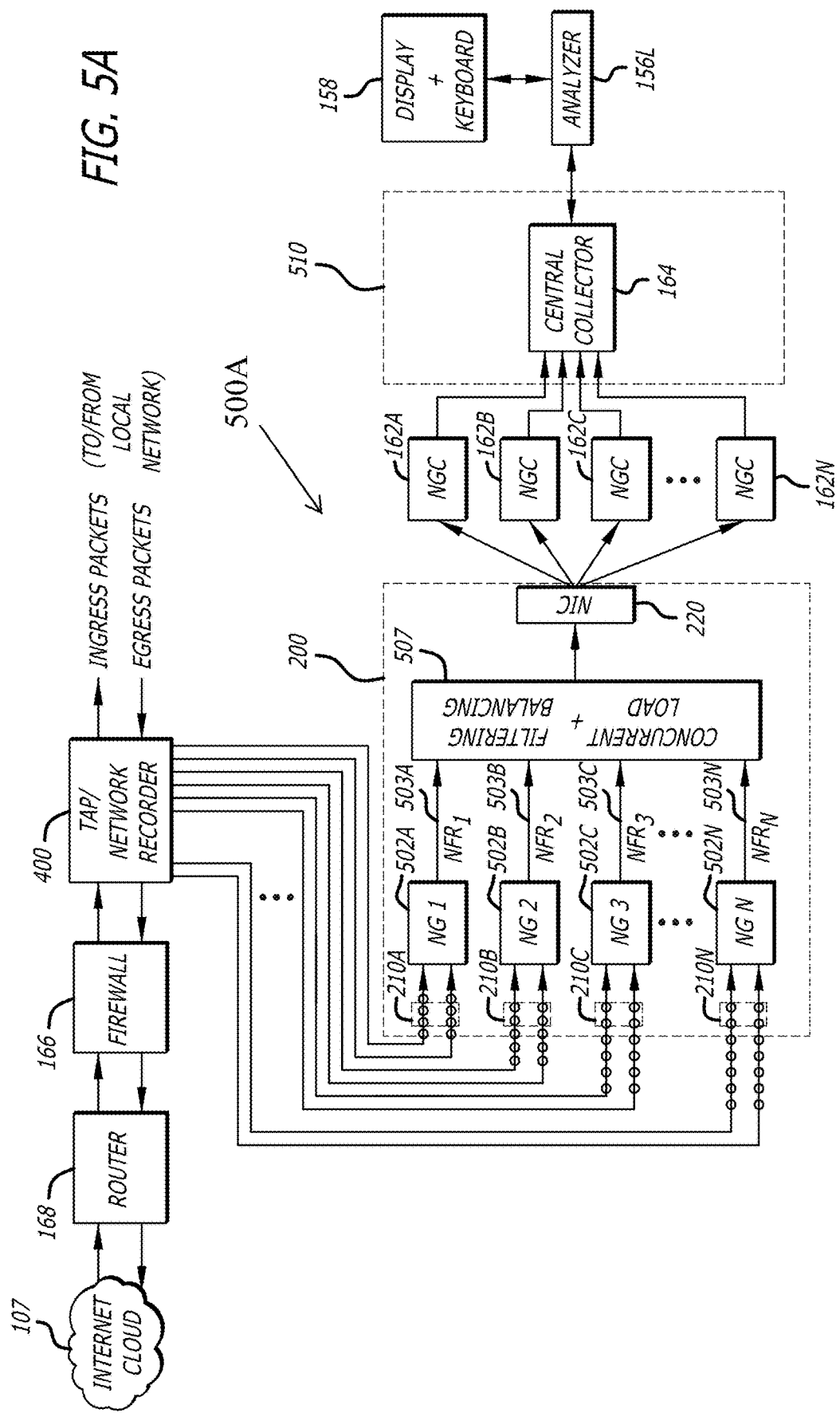

FIG. 5A is a block diagram of an example data center computer network 500A having filtering and load balancing capabilities, according to one embodiment. A purpose of FIG. 5A is to show an example netflow generator appliance (NGA) 200 within the context of the data center computer network 500A.

The data center computer network 500A includes, without limitation, the router 168, the firewall 166, the tap/network recorder 400, the example NGA 200, multiple netflow collectors 510, the analyzer 156L, and the management console 158. One NGA 200 is shown for simplicity of explanation. However, the data center computer network 500A can include multiple NGAs.

In this embodiment, the NGA 200 includes, without limitation, one or more DAG cards 210A-210N (where N is a positive integer), a filtering and load balancing device 507, and a network interface controller (NIC) 220. The NGA 200 is coupled to the tap 400 and the netflow collectors 510. In the NGA 200, the filtering and load balancing device 507 is coupled to the DAG cards and to the network interface controller (NIC) 220.

The netflow collectors 510 include, without limitation, NFCs 162A through 162N (where N is a positive integer) and a central collector 164. The NFCs are coupled to the central collector 164 and to the NIC 220 of the NGA 200 over a local area network of the data center 500A.

Figure 6A:
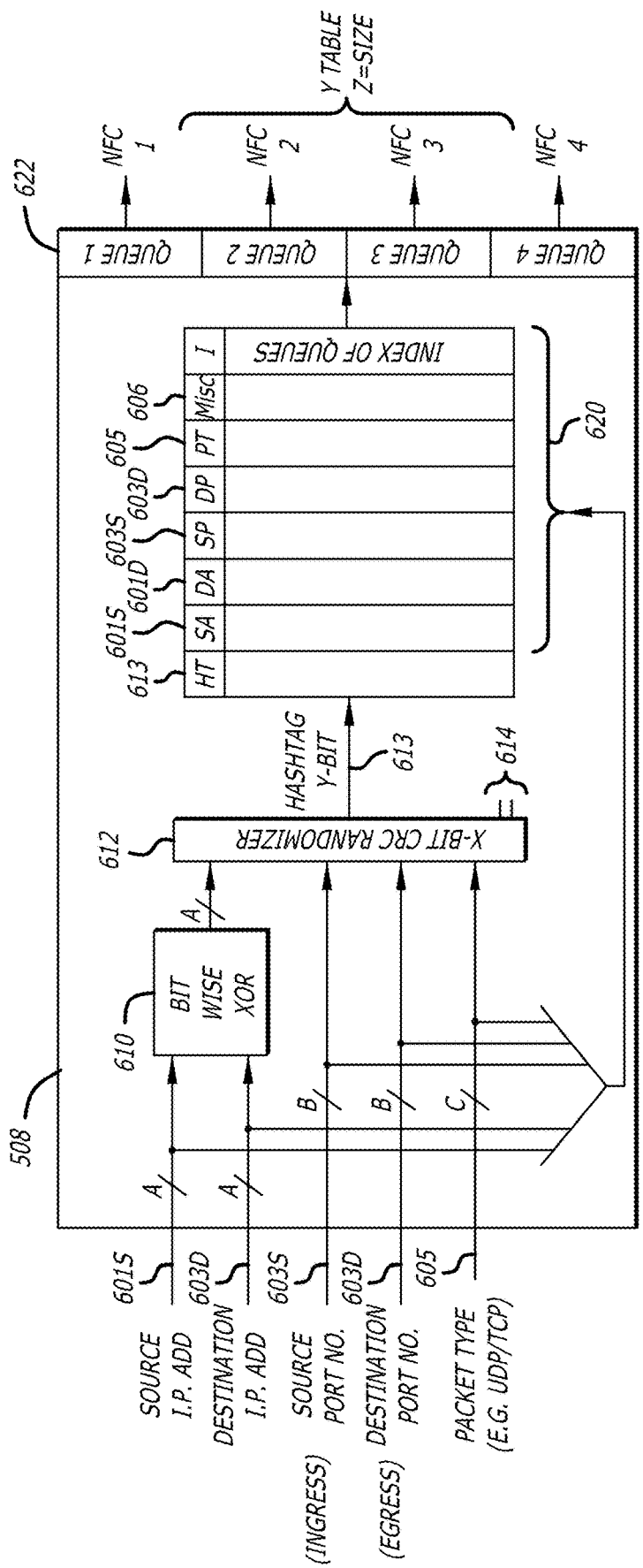
FIGS. 6A-6B illustrate functional block diagrams of hash tag load balancing of netflow records with a sorting table.
Figure 6B:
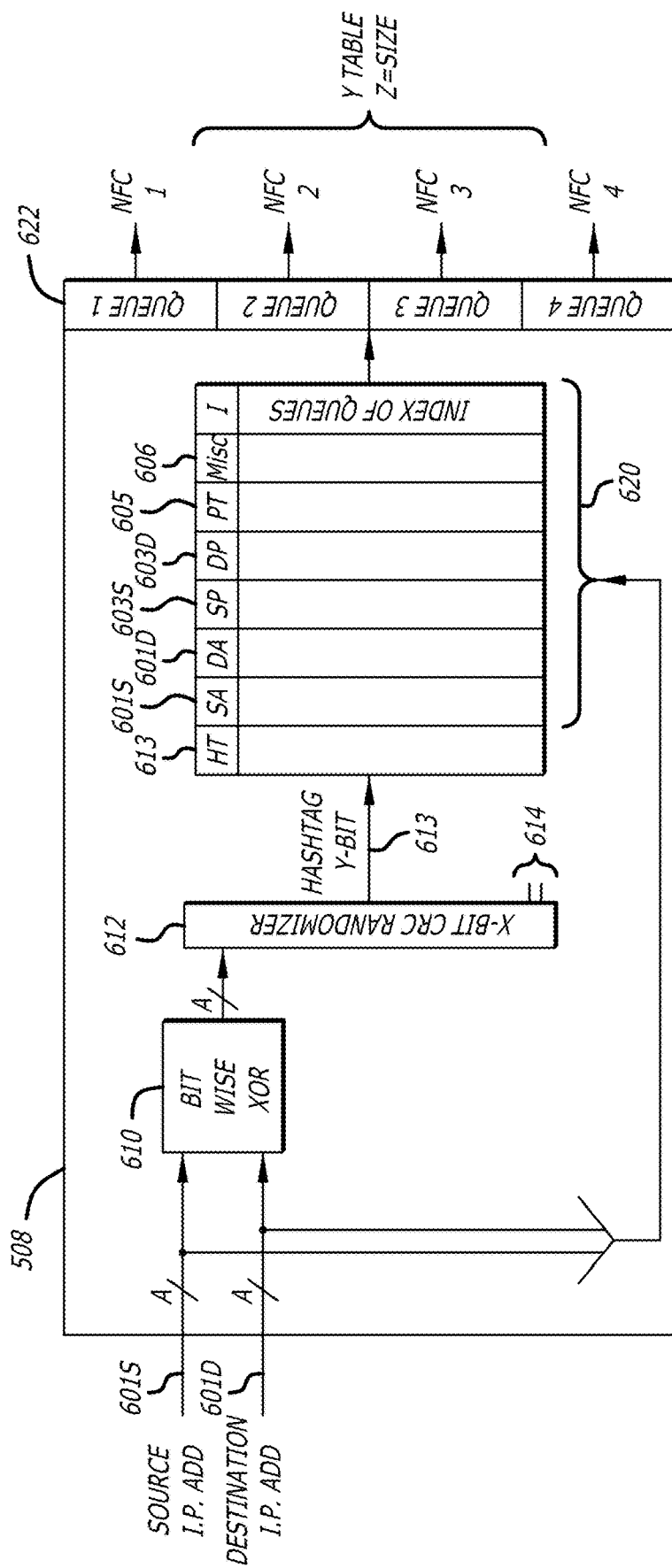

The filtering and balancing device 507 performs hash tag load balancing operations as further discussed herein with reference to FIG. 6A-6B, among other figures. Based on the hash tag load balancing, the filtering and balancing device 507 routes each netflow record to one of the NFCs by using an Internet Protocol (IP) packet address.

The tap/network recorder 400 is also coupled to servers (not shown in FIG. 5A) of the local area network of the data center computer network 500A. In one embodiment, the tap/network recorder 400 is coupled to the servers via a bi-directional cable that can transport, in both directions, ingress packets to the local area network and egress packets from the local area network.

Referring now to FIG. 5B, a block diagram of an example data center computer network 500B having filtering and load balancing capabilities, according to one embodiment. FIG. 5B shows an example netflow generator appliance (NGA) 200' within the context of the data center computer network 500B.

The data center computer network 500B is similar to the data center computer network 500A of FIG. 5A. However, in the embodiment of FIG. 5B, the NGA 200' includes a filtering device 506 that is separate from a load balancing device 507. The filtering device 506 can filter out or drop undesired net flow records and pass desired netflow records to the load balancing device 507. The filtering device 506 can be user programmed with custom filters to selectively filter out netflow records and pass netflow records for load balancing and export to netflow collectors. The load balancing device 508 balances out the number of netflow records (NFRs) that pass through the filtering device 506 to a plurality of netflow collectors to which the NGA is coupled in communication. The netflow records may be randomly balanced out to the netflow collectors. Alternatively, a hash tag can be generated and associated with the netflow record so that the NGA can redistribute the netflow records to the appropriate netflow collectors.

Architecture of a Netflow Generator Appliance (NGA)

Figure 2:
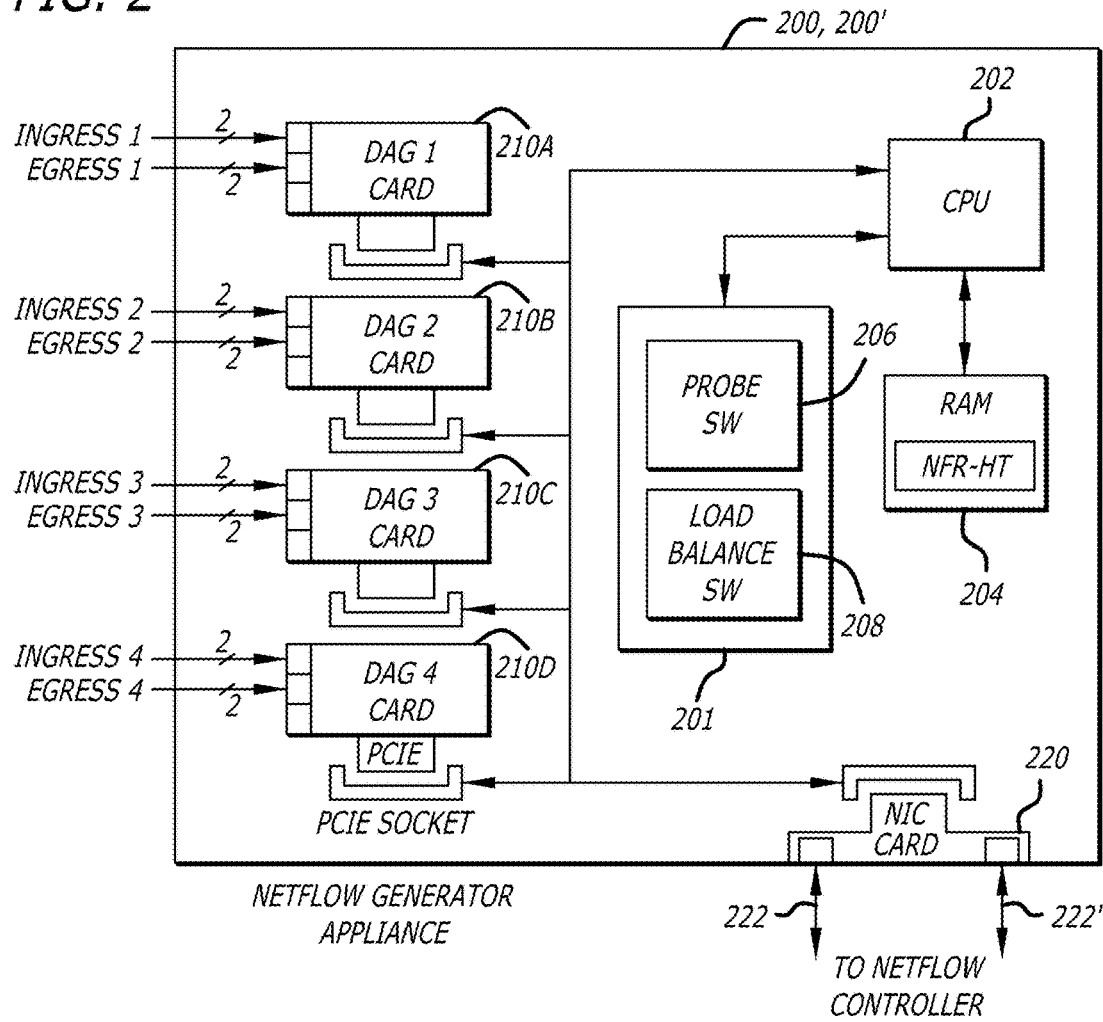
FIG. 2 illustrates a physical block diagram of a netflow generator appliance (NGA).

FIG. 2 is a more detailed block diagram of the NGA 200 of FIGS. 13A, and 13B, according to one embodiment. The description of the NGA 200 also applies to the NGA 200' shown in FIG. 1B.

As shown in FIG. 2, the NGA 200 includes four DAG cards 210A-210D, a storage device 201, a central processing unit (CPU) 202, random access memory (RAM) 204, PCIe sockets, and a network interface controller (NIC) socket. The storage device 201 can store probe software 206 and load balancing software 208. RAM 204 can store netflow record hash tags (NFR-HTs).

Each DAG card 210A-210D includes a Peripheral Component Interconnect Express (PCIe) connector that couples the DAG card to a PCIe socket on the motherboard of the NGA 200. Each PCIe socket is coupled to the CPU 202 and the NIC socket. The NIC socket can be coupled to an NIC card 220. The NIC card 220, includes ports 222 and 222' to couple to a netflow controller (e.g., netflow controller 162A of FIG. 1). Each DAG card 210A-210D is thereby coupled to the CPU 202 and the NIC card 220.

In one embodiment, each DAG card 210A-210D includes two bi-directional ports. Each bi-directional port has an ingress capability and an egress capability. In one embodiment, the bi-directional ports may be Ethernet ports. In some embodiments, the ports on the DAG cards may be Fibre Channel ports that are compatible with a Fibre Channel specification.

Four DAG cards are shown in FIG. 2 for explanatory purposes. Another embodiment of an NGA may include fewer or additional DAG cards.

As for the actual NGA performance, statistics demonstrate the volume of packet flow and the need for load balancing. The DAG cards 210A-210D manage the receipt of packets. Software executed by the CPU 202 of the NGA 200,200' generates the netflow records.

In one embodiment, each NGA is capable of consuming thirty gigabits per second (30 Gbps) of packet data and generating up to six hundred thousand (600,000) netflow records per second with no packet sampling required (e.g., zero packet loss). Oftentimes, a netflow collector (NFC) cannot consume netflow records at the rate that an NGA can send the netflow records. Such a situation would typically require some packet sampling so as not to overwhelm the number of collectors available. Accordingly, given the volume of packet flow through NGAs, there is a need for load balancing at each NGA, wherein the DAG cards manage the packets (e.g., netflow records) and other devices on the NGA execute software for load balancing netflow records.

Data Acquisition and Generation (DAG) Card

Figure 3:
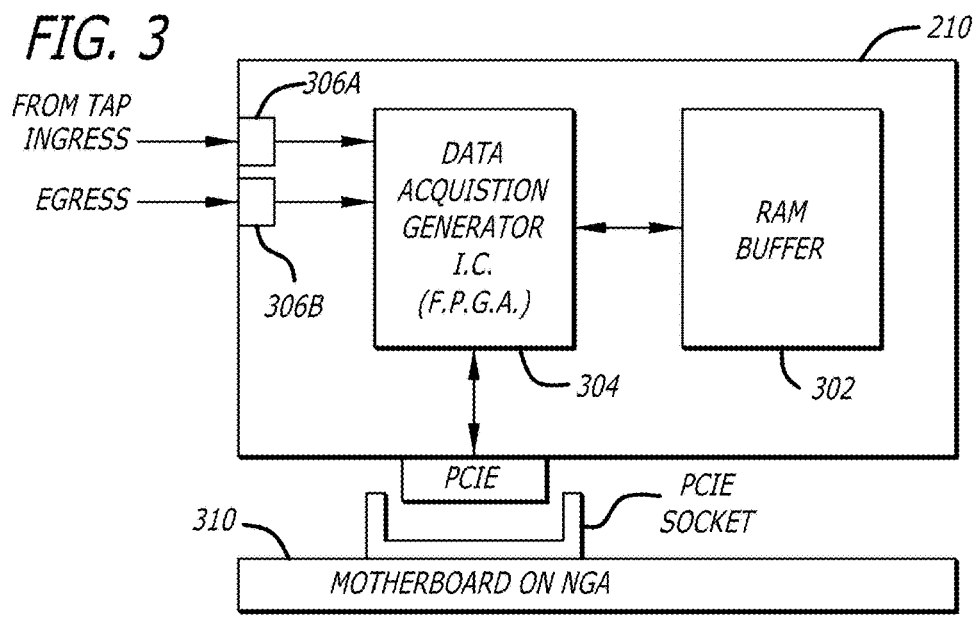
FIG. 3 illustrates a physical block diagram of a programmable data acquisition and generation (DAG) card that may be programmed for use in the netflow generator appliance (NGA illustrated in FIG. 2 and the intelligent network recorder shown in FIG. 4.

FIG. 3 is a more detailed block diagram of an example DAG card 210, according to one embodiment. The DAG card 210 also includes an integrated circuit (IC) 304, a RAM buffer 302, a Peripheral Component Interconnect Express (PCIe) connector, and two communication ports 306A and 306B. The IC 304 is coupled to RAM buffer 302. The PCIe connector couples the DAG card to a PCIe socket on a motherboard 310 of an NGA.

In one embodiment, the IC 304 includes a field-programmable gate array (FPGA). Accordingly, via the FPGA, the DAG card 210 is programmable to be located at anywhere required in the data center computer network. In particular, the DAG card 210 is programmable to acquire data packets from the data center, generate a hash tag for each data packet, and insert the hash tag into a header of the data packet.

In one embodiment, the communication ports 306A and 306B are bi-directional communication ports, each having an ingress capability and an egress capability. In one embodiment, the bi-directional ports may be Ethernet communication ports. In some embodiments, the communication ports of the DAG cards may be Fibre Channel communication ports compatible with the Fibre Channel protocol.

The DAG card 210 performs packet capture and processing operations (e.g., data acquisition and generation). The primary features are load-balancing, filtering and time stamping of the packets with the ability to clone the packets to multiple memory locations.

Architecture of a Netflow Recorder (NR)

Figure 4:
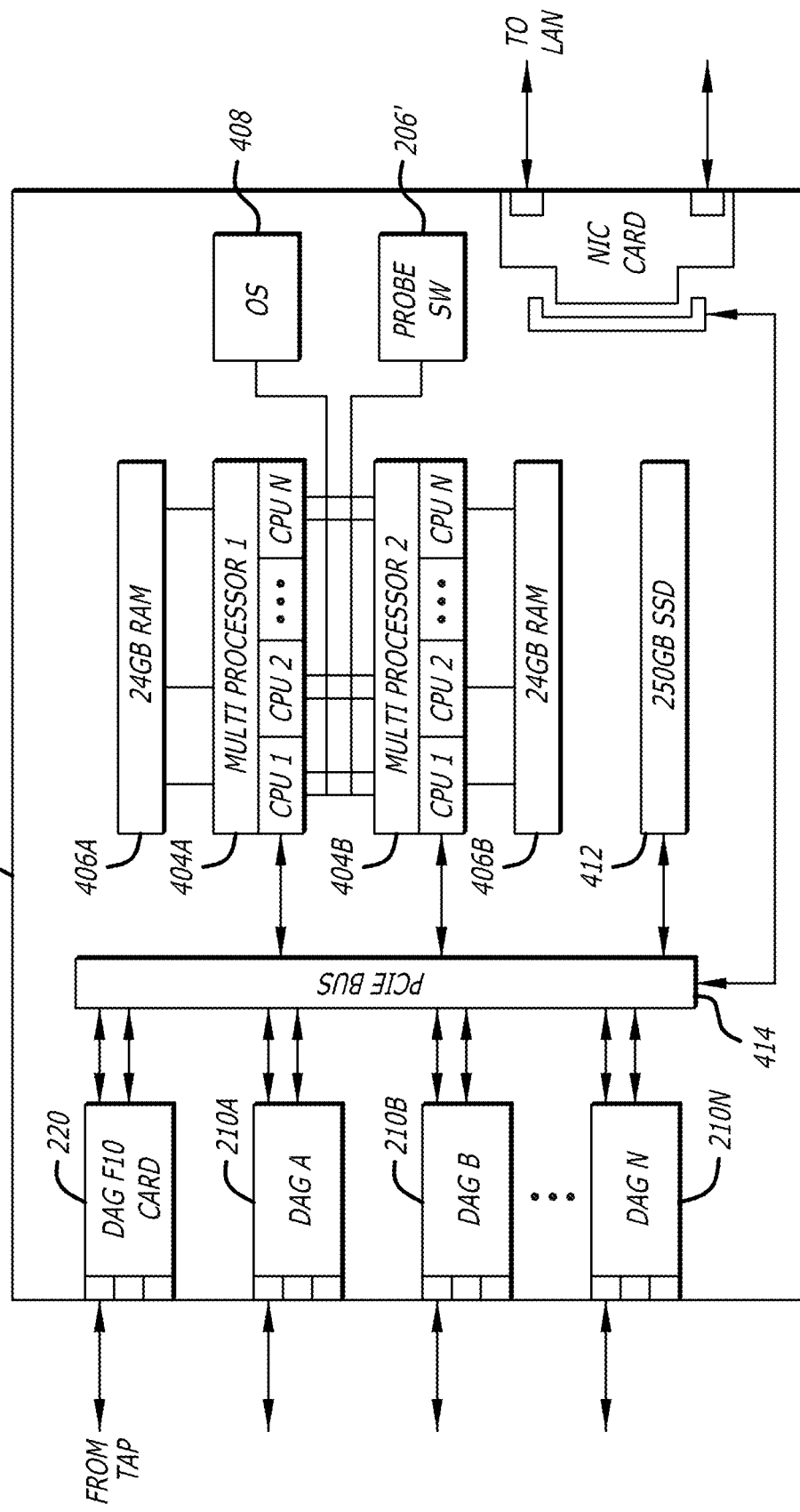
FIG. 4 illustrates a functional block diagram of a intelligent network recorder (INR), also referred to as a probe.

FIG. 4 is a more detailed block diagram of the netflow recorder (NR) 170, according to one embodiment. The NR 170 includes a DAG card 220, DAG cards 210A-210N (where N is a positive integer), a PCIe bus 414, a RAM 406A, a multiprocessor 404A, a multiprocessor 404B, a random access memory (RAM) 406B, a solid-state drive (SSD) 412, an operating system (OS) 408, probe software 206', and a network interface card (NIC) card coupled to an NIC socket.

Each DAG card is coupled to the PCIe bus 414 via a redundant path for failover and load balancing. The PCIe bus 414 is coupled to the multiprocessor 404A, the multiprocessor 404B, the SSD 412, and the NIC socket. The multiprocessor 404A, the multiprocessor 404B, the RAM 406, the RAM 406B, the OS 408, and the probe software 206' are coupled in communication together.

The tap/NR 400 basically manages each data packet for duplication so that the data center can process a primary copy for the completion of the task. The tap/NR 400 processes a secondary copy (e.g., clone) for substantially all of the potential threats that could be associated with the packet. The tap/NR 400 may also logs threats by timestamp for reporting and management purposes.

Architecture of a Filtering Device

FIG. 13A is a block diagram of a filter device 507, according to one embodiment. For context, the filtering device 507 is shown as being coupled to the netflow generator (NG) 502 (metering input), optional hash tag generator, export queues 1313A-1313N, the network interface card (NIC) 220, and multiple netflow collectors (NFCs) 162A-162N. The netflow generator 502, hash tag generator 1307, and filtering device 507 are implemented by software, hardware, or a combination of hardware (processor) and software (instructions).

The netflow generator 502 receives IP packets in a data pipe or pipeline 1305 from one or more data acquisition and generator interfaces (e.g., at least one of the DAG cards 210A-210N). The netflow generator 502 generates netflow records, such as the netflow record shown in FIG. 11B for example, in response to the received IP packets.

The netflow generator 502 may generate the hash tag values as the netflow records are generated. Alternatively, a separate hash tag value generator 1307 may be used to generate the hash tag values for the netflow records subsequent to their generation and prior to filtering.

The filtering device 507 includes a plurality of N filters 1309A-1309N (where N is a positive integer). The filters are defined according to a user input, such as the type of filter function, definitions, coefficients, parameters, and so on. The filters pass the netflow records if the user specified match filter parameters are met by the netflow record. In the case of load balancing, the hash tag values of the netflow records are evaluated against a hash tag filter range to determine if they can pass through or are blocked. If the netflow record has the appropriate hash tag value within the hash tag filter range of a given filter, it is passed through and inserted into the respective export queue 1313A-1313N associated with the filter 1309A-1309N.

Prior to passing the netflow record to the export queue, an index value (see index value 1152 shown in FIG. 11B) may be associated with the netflow record. The index value is associated with the IP address of the netflow collectors. The index value represents the available netflow collectors to which netflow records may be sent.

The index value is assigned by the filter that passes the netflow record into its respective export queue. A given filter may assign a single index value to send all of the netflow records in an associated queue to the same netflow collector. Alternatively, the index value may be varied by a filter to send the netflow records in its associated queue to different netflow collectors.

The export queues 1313A-1313N are first-in-first-out (FIFO) buffers that receive the hash tag value and the index value associated with the netflow records from the filters 1309A-1309N. The buffering provided by the queues allows the queues to gather multiple netflow records into one larger message for transfer to the netflow collectors over the LAN. The filter 507 associates each netflow record with the destination IP address of the respective netflow collector to which the netflow record is to be sent, in response to the index value and the hash tag value.

Accordingly, the network interface card (NIC) 220 receives a hash tag value and an index value associated with a netflow record from the output of the export queue. Within a single Ethernet packet, the NIC may include a plurality of netflow records from a given queue associated with a given netflow collector. The NIC may then send the Ethernet packet out onto the LAN so that it is routed to the appropriate netflow collector.

FIG. 13B is a block diagram of multiple filter devices 507A-507M, according to one embodiment. FIG. 13B is similar to FIG. 13A, except that FIG. 13B includes a plurality of M filters 507A-507M (where M is a positive integer) for a plurality of N netflow generators (NGs) 502A-502N. The NGA 200 of FIG. 13B includes a plurality of N netflow generators (NGs) 502A-502N to concurrently process packets in parallel in response to greater packet loads from a plurality of data acquisition and generator interfaces (e.g., DAG cards 210A-210N). A plurality of export queues 1313AA-1313NM may be coupled to the plurality of M filters 507A-507M to support the plurality of netflow generators 502A-502N.

Architecture of a Load Balancing Device

Figure 8:
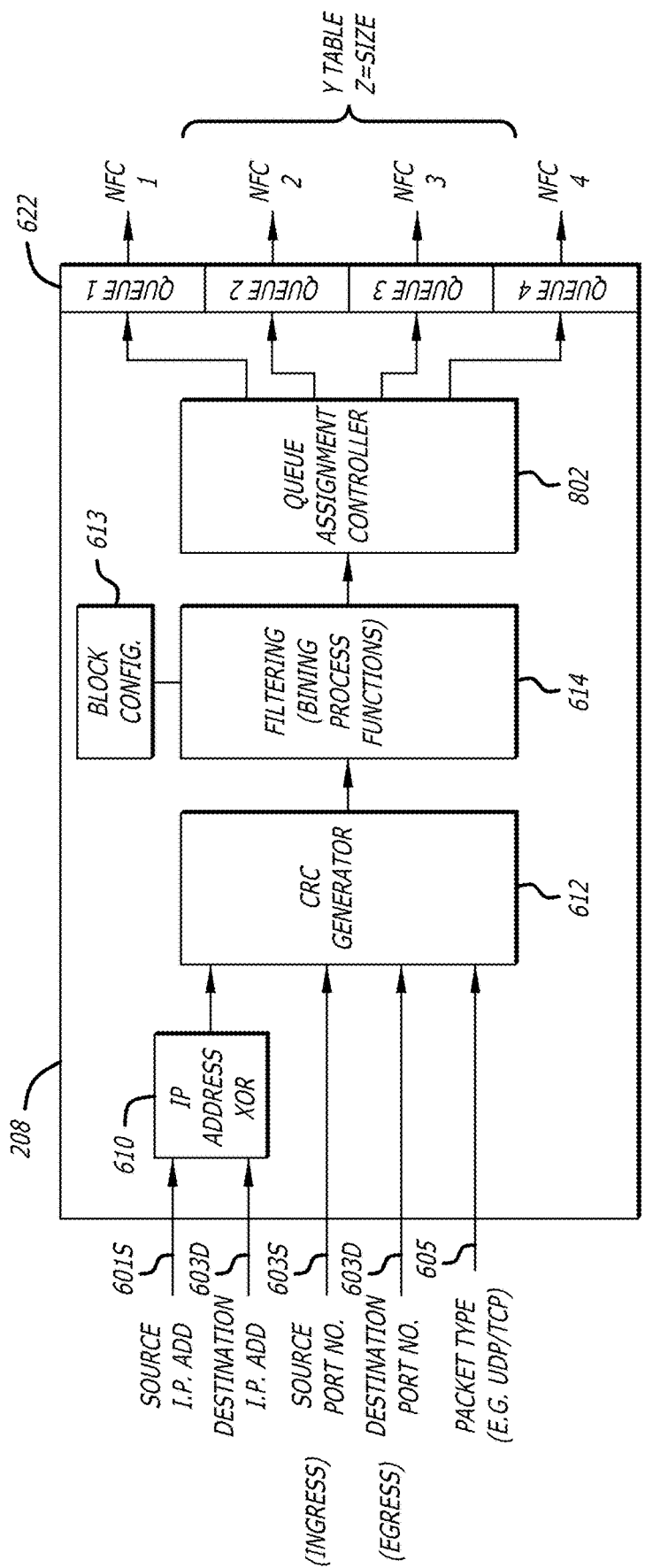
FIG. 8 illustrates a functional block diagram of the hash tag load balancing software for load balancing net flow records.

Referring now to FIG. 8, a block diagram of the software architecture for the load balancing device 208 of FIG. 2, according to one embodiment. The load balancing device 208 comprises software, hardware, or a combination there of. The load balancing device 208 can receive a header of a packet and carry out operations to route the packet to an appropriate NFC for load balancing.

The load balancing device 208 includes a cyclic redundancy check (CRC) randomizer 612, a configuration block 613, a filtering process 614, a queue assignment controller 802, an exclusive-or (XOR) gate 610, and queues 1 through 4 (622). The components of the load balancing device 208 are coupled as shown in FIG. 8. The load balancing device 208 can receive, from a header of a packet, a source address 601S, a destination address 601D, a source port number 603S (e.g., for ingress), a destination port number 603D (e.g., for egress), a packet type 605 (e.g., User Datagram Protocol (UDP), Transmission Control Protocol (TCP)), and miscellaneous information 606 (e.g., ICMP type/code, TOS, etc.), among other information.

Further details of the filtering and load balancing devices are described with reference to FIGS. 6A, 6B, and 7.

Filtering and Load Balancing of Netflow Records

A filtering device (e.g., filtering device 506) provides the ability to create custom filters and export specific flow records to external netflow collectors. A filter device includes one or more user-defined functions, as further explained below, which can determine the netflow collector to which a netflow record is sent.

For example, a user (e.g., network administrator) can forward all netflow records corresponding to a specific source IP to a netflow collector and all the netflow records corresponding to a specific destination IP address to another netflow collector by appropriately configuring functions in the filters.

The use of IP address based filtering is useful when there is a need to use different metering inputs for different traffic. However, IP address based filtering often does not achieve even balanced netflow record loads across multiple netflow collectors. Using hash based load balancing of netflow records over multiple netflow collectors can achieve an evenly balanced spread of netflow records across multiple external netflow collectors.

In one embodiment, a load balancing device (e.g., load balancing device 508) makes use of cyclic redundancy check (CRC) randomizer to define a hash value for each received netflow record. The hash value is associated or appended to the netflow record as a hash tag value. A load balancing percentage range may be defined for each load balancing filter by one or more user-defined functions for each filtering device. Each hash value or hash tag may be converted to a percentage for comparison. In a case where user defined percentage ranges overlap amongst filters, netflow records may be duplicated and sent to two different netflow collectors.

A user defines parameters of a filter function, such as by a filter template. For load balancing, a range of hash tag values or a percentage of NFRs is defined for each of a plurality of filtering functions. The filtering function is typically a pass type filtering function. That is, the user defines parameters for netflow records that are desired to pass through the filter, such that other netflow records are blocked by the given filtering function. However, the filtering function could be defined as a stop or blocking type of filter as well, with the parameters defining what netflow records are blocked from being collected while other netflow records are passed through.

The user parameters and filter software are compiled to form the software filtering function. After compilation, the filter software is executed by a processor to filter the netflow records. An NGA (e.g., NGA 200) compiles the filter software once in the startup phase of the export thread, scans substantially the entire filter configuration, and generates a linked list of filter expressions that are used during execution of the filter.

The objects in the linked list contain a pointer to the filter function that is optimized to deal with a particular filter expression and a list of values that have been specified. The NGA stores the values in a linked list in a way that is optimal for the use with the particular filter function.

The NGA calls the filter-executor in the context of an export thread with each NFR in an Ethernet packet that is going to be exported from the NGA. The NGA applies this record successively to all filter functions that are in the list, trying to match the record with each attached value. If any value matches, the NGA proceeds with the next filter function in the list. When the end of the filter list is reached, the record passes.

However, if none of the values for this particular function matches, the record is filtered out and does not pass. The filter value list may be empty. This can be required by the function, because the function does not need match values (e.g., "unmatched"), or the function might be a transitional state during the configuration process.

The filter functions are intended to work as efficiently as possible. All filters should have in common that when the first match is found, the NFR is passed by the given filter function. If no match is found after comparing all match values in the list, the NFR does not pass by the filter.

The following example filtering functions (indicated by parenthesis "( )" after the name) may be user-defined at the current state:

ip-address( )—This function takes a list of subnet denominations as match values, both IPv4 and Iv6. The function compares each subnet in the list with both source address and destination address of the applied netflow record.

ip-src( )—This function takes a list of subnet denominations as match values, both IPv4 and Iv6. The function compares each subnet in the list with the source address of the applied netflow record.

ip-dst( )—This function takes a list of subnet denominations as match values, both IPv4 and Iv6. The function compares each subnet in the list with the destination address of the applied netflow record.

port( )—This function takes a list of port or port ranges as match values, ranging from 0 to 65535. The function compares each given port or port range with both source port and destination port of the applied netflow record.

port-src( )—This function takes a list of port or port ranges as match values, ranging from 0 to 65535. The function compares each given port or port range with the source port of the applied netflow record.

port-dst( )—This function takes a list of port or port ranges as match values, ranging from 0 to 65535. The function compares each given port or port range with the destination port of the applied netflow record.

ip-protocol( )—This function takes a list of IP protocol numbers as match values, ranging from 0 to 255. The function compares each given protocol number with the protocol files of the applied netflow record.

process-id( )—The user has the option to route a single process_id to a single NFC. Given that the software is working fine, this function should provide a load balanced output, based on the incoming traffic. The output of the NGA might be unbalanced, especially when large number of packets belong to one or two flows. The process-id filter provides a fixed way of load balancing the traffic.

unmatched( )—This filter matches all records that do not match any of the other filters. The function does not require any match values.

hlb( )—The hash load balancing filter function load balances the netflow records (NFRs) concurrently with the prior filter functions if they are selected. The hash tag is generated prior to filtering so that the NGA can redistribute the netflow records to the appropriate netflow collectors. A filter function is a convenient place to implement this feature as the function gives the user the option to do extra filtering before the record gets exported to a netflow collector.

As further described with reference to FIG. 7, in one embodiment, a hash tag filter range, a user input, for a load balancing filter may be in a range from 0 to 100, for example. Filter functions may have multiple expressions. However, fewer expressions tend to facilitate a faster running system.

A data center may require all the IP address pairs to go to the same NFC in order to maximize accuracy. By a user modifying the IP address ranges going to NFCs, the NFCs are no longer going to receive the same IP pairs as a previous configuration. A user can take such consequences into account when modifying the ranges.

When two netflow generators (metering instances) deal with corresponding flow in different directions and then hash load balance the netflow record to different NFCs, it is important to use the same distribution range (e.g., the hlb( ) filter function) for each external NFC, in order to transmit flow and reverse flow to the same NFC.

The hash value required to balance is generated in the netflow record generation process (metering context) by a netflow generator (metering input) based on the source IP address and the destination IP address for both IPv4 and IPv6. A hash tag value associated with a netflow record are in a predetermined range of values from 0 to Hmax, such as in the range from 0 to 999, or 0 to 1024, for example. The hash tag value is then propagated by the internal flow item structure until the value reaches the export thread, where the hlb( ) filter function uses the value to select what export queue to insert the NFR into for the respective netflow collector.

Since the generation of the hash value is an additional workload, the hash value is calculated when at least one filter utilizes the hlb( ) filter function, even if the filter is currently not in use. If no filter uses the hash-tag load balancing hlb( ) filter function, then the generation of the hash tag may be skipped.

In one embodiment, the load balancing filter frontend uses hash tag match values (hash tag filter values) from 0.0 to 100.0. For example, a hash tag filter value range of 0.0-25.0 may be mapped to hash values 0-249, a hash tag filter value range of 25.0-50.0 may be mapped to hash values 250-499, a hash tag filter value range of 50.0-75.0 may be mapped to hash values 500-749, and a hash tag filter value range of 75.0-100.0 may be mapped to hash values 750-1000, in order to make it user-friendly. Adjacent ranges can be simply described by repeating the preceding upper interval number as the lower interval number of next range, without causing any overlapping ranges, such as 0.0-50.0 and 50.0-100.0.

As described below with reference to FIGS. 6A, 6B, and 7, in order to simplify the implementation of new filter functions a table is used to register the function keywords, the help/hint text as well as the function pointer and the scan functions.

Hash Tag Load Balancing

As further described with reference to FIGS. 6A, 6B, and 7, adding a filter to the NGAs that enables the user to select a range 0-100 for outputting the records gives a finer grain record load balancing and is closer to the goal of not oversubscribing the NFCs.

FIG. 6A is a more detailed block diagram of the load balancing device 508 of FIG. 5B, according to an embodiment. In one embodiment, the load balancing device 508 is a more detailed view of the load balancing device 208 of FIGS. 2 and 8. Referring again to FIG. 6A, the load balancing device 508 comprises software, hardware, or a combination there of.

The load balancing device 508 receives a header of a packet and carries out operations to route the packet to an appropriate NFC for load balancing. The load balancing device 508 includes a load balancing table 620, a cyclic redundancy check (CRC) randomizer 612, an XOR gate 610, and queues 1 through 4. The components of the load balancing device 208 are coupled as shown in FIG. 6A. The load balancing device 208 can receive, from a header of a packet, a source address 601S, a destination address 601D, a source port number 603S (e.g., for ingress), a destination port number 603D (e.g., for egress), a packet type 605 (e.g., User Datagram Protocol (UDP), Transmission Control Protocol (TCP)), and miscellaneous information 606 (e.g., ICMP type/code, TOS, etc.), among other information.

The exclusive-or (XOR) gate 610 performs a bitwise exclusive-or logical operation on respective bits of the source IP address 601S and the destination IP address 601D. The XOR gate 610 sends the exclusive-or results of the bitwise XOR operation to the CRC randomizer 612. The CRC randomizer 612 is configured to receive X-bits of data, where X is a positive integer. The X-bits of data can include the result of the bitwise XOR gate 610, the source port number 603S (e.g., for ingress), the destination port number 603D (e.g., for egress), the packet type 605 (e.g., UDP, TCP), and miscellaneous information 606 (e.g., ICMP type/code, TOS, etc.), among other information.

Bit lengths may vary depending on the version of the Internet Protocol in which the NGA is operating. For example, if the NGA is operating in IPv4, then the length of the source IP address 601S, the destination IP address 601D, and the XOR gate result may each be 32 bits. The length of the source port number 603S plus the packet type 605 may be 16 bits total. The length of the destination port number 603D plus the packet type 605 may be 16 bits total. In such a case, the total number of bits provided to the CRC randomizer 612 is 48 bits.

As another example, if the NGA is operating in IPv6, then the length of the source IP address 601S, the destination IP address, and the XOR gate result may each be 128 bits. The length of the source port number 603S plus the packet type 605 may be 16 bits total. The length of the destination port number 603D plus the packet type 605 may be 16 bits total. In such a case, the total number of bits provided to the CRC randomizer is 144 bits. The CRC randomizer 612 can disregard dropped bits 614 where the input to the CRC randomizer 612 is longer than the predetermined X number of bits.

From the remaining X-bits, the CRC randomizer 612 generates a hash tag 613 having Y-bits, where Y is a positive integer. In one embodiment, a DAG card generates the hash tag. Accordingly, the load balancing device 508 may include, at least in part, a DAG card.

The load balancing table 620 is configured to receive the hash tag generated by the CRC randomizer 612, the source IP address 601S, the destination IP address 601D, the source port number 603S (e.g., for ingress), the destination port number 603D (e.g., for egress), the packet type 605 (e.g., UDP, TCP), and miscellaneous information 606 (e.g., ICMP type/code, TOS, etc.), among other information.

The load balancing table 620 also includes a user-defined index of queues. The index of queues determines the appropriate queue for the netflow record based on the hash tag 613 that the CRC randomizer 612 generated for the netflow record. The particular queue placement determines the NFC to which the netflow record is sent. The index of queues is further described below with reference to FIG. 7.

FIG. 6B is another block diagram of the load balancing device 508 of FIG. 5B, according to one embodiment. FIG. 6B is similar to FIG. 6A, except the load balancing device 508 receives the source IP address 601S and the destination IP address 601D. Accordingly, the CRC randomizer 612 generates a hash tag based on the result of the XOR gate 610.

Figure 7:
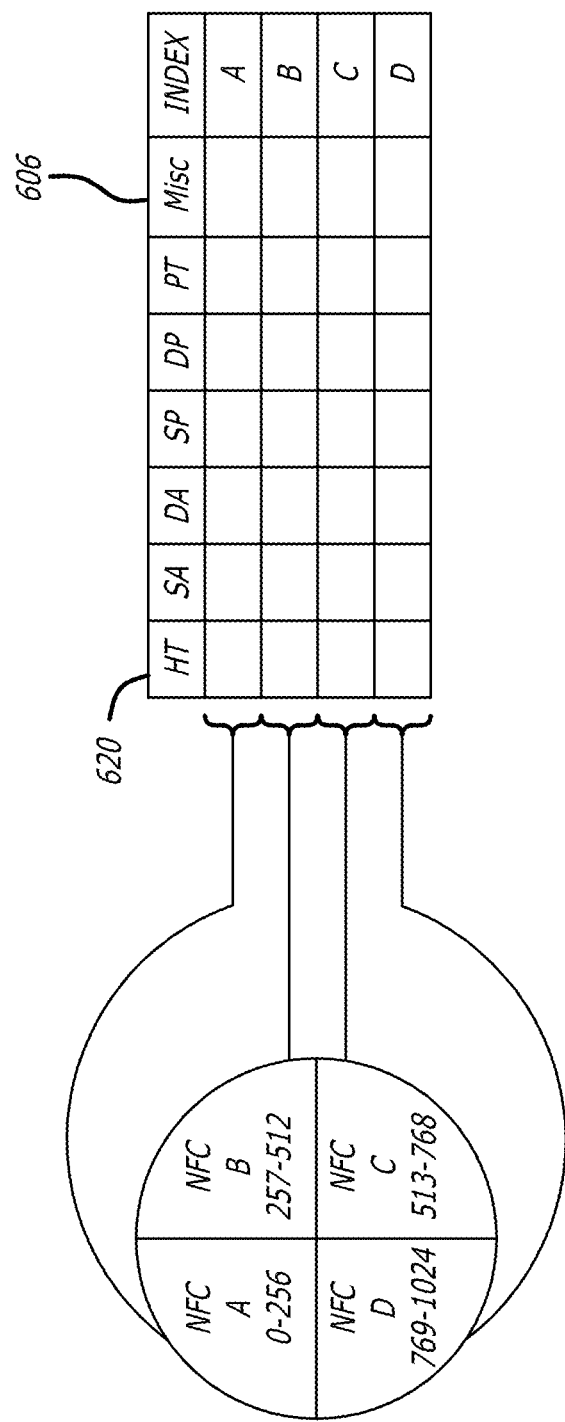
FIG. 7 illustrates an example of the function of hash tag load balancing of netflow records with a sorting table.

FIG. 7 is a conceptual block diagram of the load balancing table 620 of FIGS. 6A and 6B, according to one embodiment. The user-defined index of queues is divided into quadrants. For example, if a hash tag of a netflow record has a value between 0 and 256, the NGA assigns the netflow record to the A index. If a hash tag of a netflow record has a value between 257 and 512, the NGA assigns the netflow record to the B index. If a hash tag of a netflow record has a value between 513 and 768, the NGA assigns the netflow record to the C index. If a hash tag of a netflow record has a value between 769 and 1024, the NGA assigns the netflow record to the D index. Based on how the netflow record is indexed, the NGA queues the netflow record and sends the netflow to the NFC predetermined for the queue.

In some embodiments, the user may define the index of queues to be divided unevenly. As one of many examples, if a hash tag of a netflow record has a value between 0 and 50, the NGA assigns the netflow record to the A index. If a hash tag of a netflow record has a value between 51 and 200, the NGA assigns the netflow record to the B index. If a hash tag of a netflow record has a value between 201 and 800, the NGA assigns the netflow record to the C index. If a hash tag of a netflow record has a value between 801 and 1024, the NGA assigns the netflow record to the D index. Based on how the netflow record is indexed, the NGA queues the netflow record and sends the netflow to the NFC predetermined for the particular queue.

Ethernet Packet

Figure 11A:
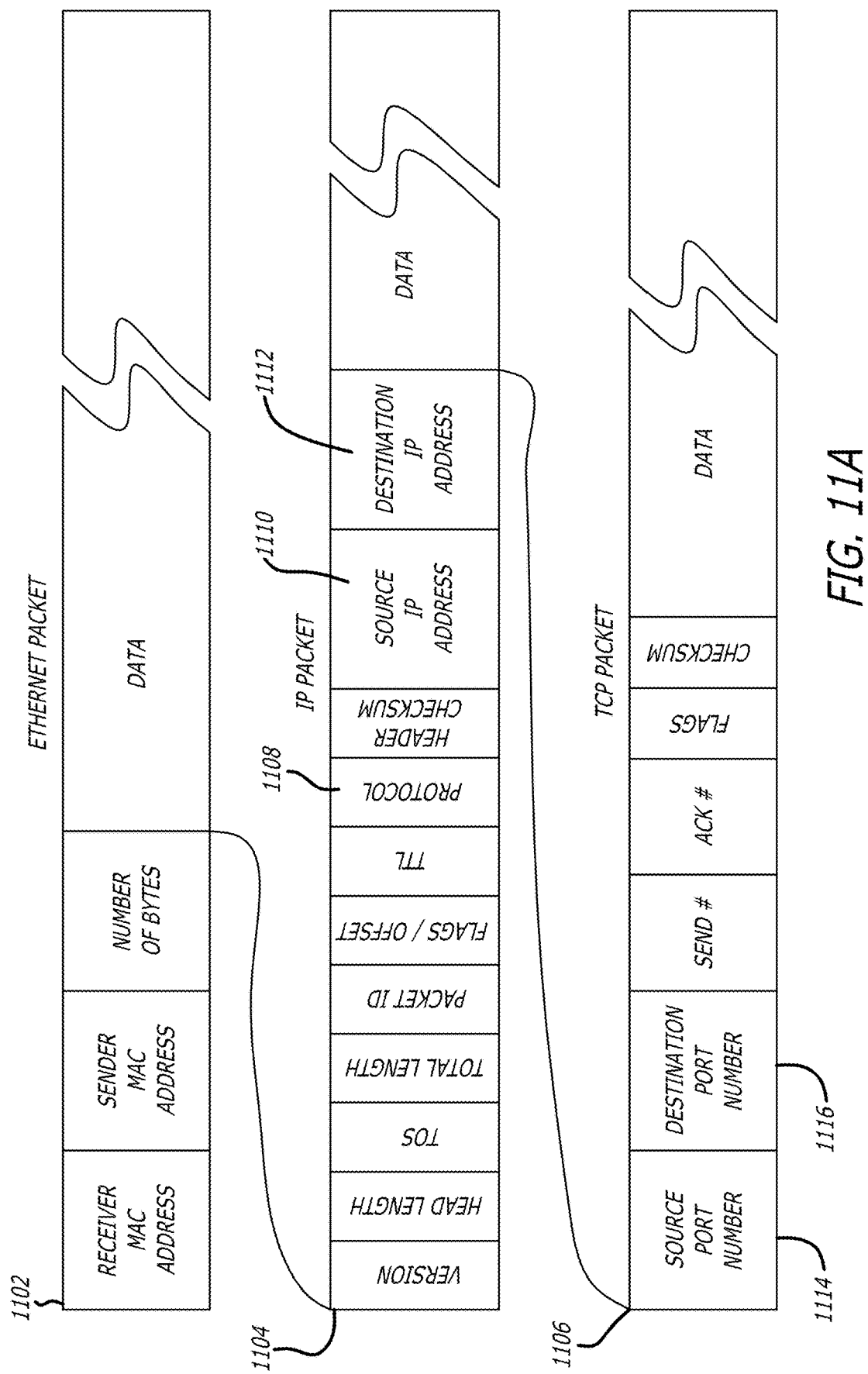
FIG. 11A illustrates a diagram of an exemplary Ethernet packet.

FIG. 11A is a diagram illustrating an example Ethernet packet 1102. The Ethernet packet 1102 includes a header field and a data field. The header field of the Ethernet packet 1102 includes a destination or receiver media access control (MAC) address, a source or sender MAC address, and a field of a number of bytes of optional header information.

The data field of the Ethernet packet 1102 includes an IP packet 1104, which includes a header field and a data field. The header field of the IP packet 1104 includes a version field, a header length field, a type of service (ToS) field, a total length field, a packet identifier, a time to live (TTL) field, a protocol field 1108, a header checksum, a source IP address 1110, and a destination IP address 1112.

The data field of the IP packet 1104 may include a transmission control protocol (TCP) packet, a UDP packet, or an SCTP packet. FIG. 11A illustrates a transmission control protocol (TCP) packet 1106 including a header field and a data field. The header field of the TCP packet 1106 include a source port number 1114, a destination port number 1116, a send number, an acknowledgement number, one or more flags, and a checksum.

Netflow Record

Figure 11B:
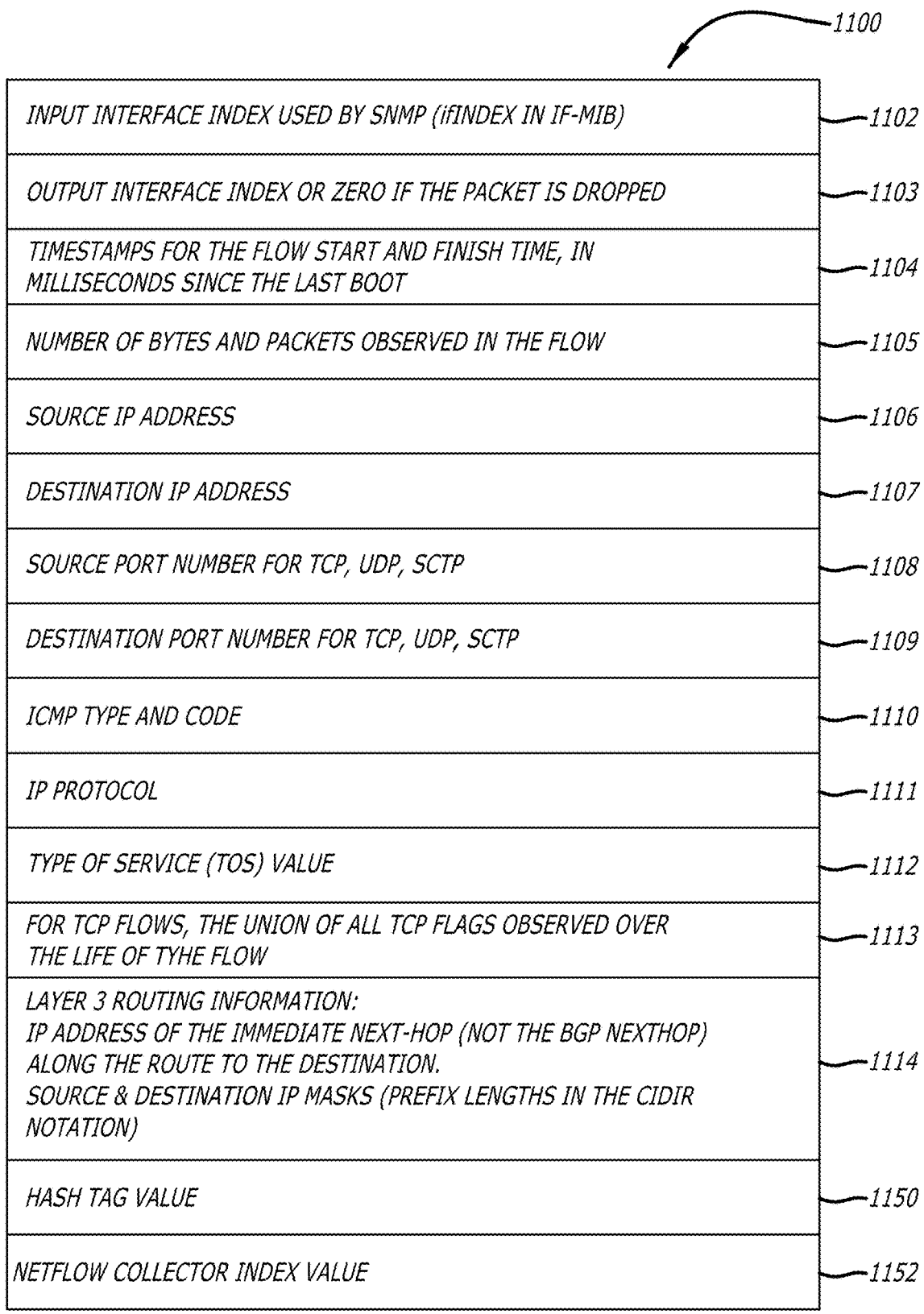
FIG. 11B illustrates a diagram of an exemplary netflow record with associated hash tag and index.

FIG. 11B is a diagram of an exemplary netflow record (NFR) 1100 indicating its fields. As shown in FIGS. 5A-5B, a netflow record is generated by the netflow generators (NG) 502A-502N in the netflow generator appliance (NGA) 200, 200' over a period of time for a given communication session between two internet protocol (IP) addresses. The netflow record 1100 may include one or more of an input interface index used by SNMP Windex in IF-MIB) 1102, an output interface index 1103 (zero if the packet is dropped), timestamps 1104 for the IP packet flow start and finish time, the number of bytes and packets observed in the flow 1105, the source IP address 1106, the destination IP address 1107, the source port number (e.g., TCP, UDP, and/or SCTP port number) 1108; destination port number (e.g., TCP, UDP, and/or SCTP port number) 1109, ICMP type and code 1110, IP protocol 1111, and the type of service (ToS) value 1112. For TCP flows, the netflow record may also include a union of all TCP flags observed over the life of the IP packet flow 1113. Layer 3 routing information may also be included in the netflow record 1100, such as the IP address of the immediate next-hop (not the BGP nexthop) along the route to the destination, and the source & destination IP masks (prefix lengths in the CIDR notation) 1114.

For load balancing of netflow records, the netflow record 1100 may include a hash tag value 1150 and a netflow collector index value 1152. The hash tag value 1150 may be computed as described herein. The hash tag value may be appended as another field as shown or merely associated with the netflow record. The index value 1152 represents the netflow collector to which the associated netflow record is to be sent. The index value associated with a netflow record may be assigned by the filter that passes the netflow record into the respective export queue.

While a netflow record (NFR) has been particularly described herein, other types of network flow records may be used in the alternative with some embodiments, such as Internet Protocol Flow Information eXport (IPFIX) records.

Methods of Load Balancing

Figure 9:
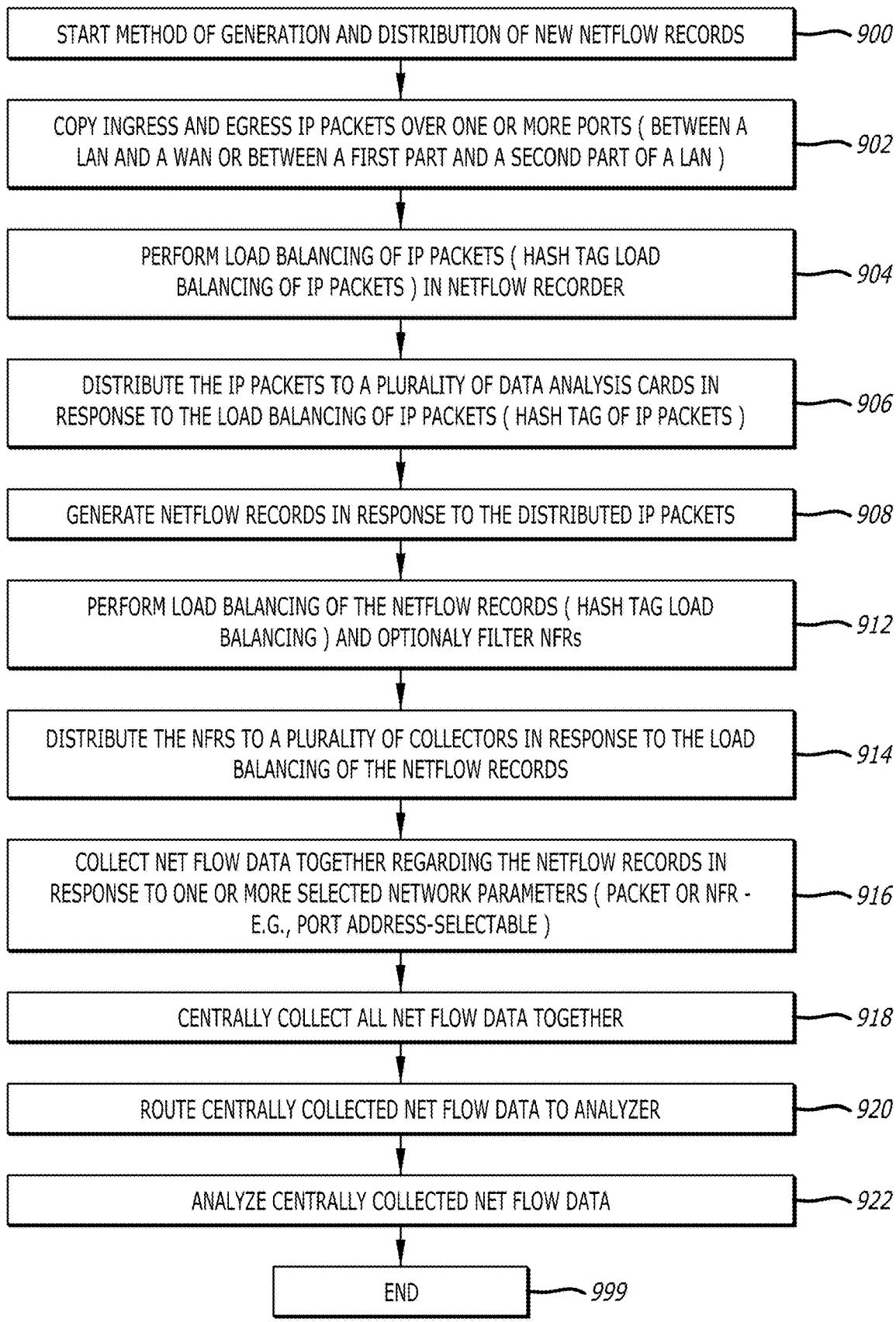
FIG. 9 illustrates a flow chart of an exemplary method of distributing netflow records to load balance over a plurality of netflow record collectors.

FIG. 9 is a flowchart of a method for a selective load balanced distribution of netflow records, according to one embodiment. The method begins with process block 900 and goes to process block 902.

At process block 902, the ingress IP packets and the egress IP packets at one or more ports are copied so that they can be analyzed. The ingress IP packets and egress IP packets that are copied may be those communicated between a local area network (LAN) and a wide area network (WAN) separated by a router. Alternatively, the ingress IP packets and egress IP packets that are copied may be those communicated between a first part of a LAN and a second part of the LAN.

Next at process block 904, the IP packets are prepared to be sent to one or more netflow generation appliances (NGA's) and a plurality of DAG (data acquisition and generation) cards to analyze the IP packets. The IP packets may be selectively load balanced for the netflow recorder so that a quantity of IP packets are selectively distributed to the plurality of DAG cards. The load balancing of the IP packets may employ a hash tag to randomize the IP packets to be sent to the plurality of DAG cards in the one or more netflow generation appliances (NGA).

Next at process block 906, the IP packets are distributed from the network recorder 400 to the DAG cards 210A-210N in the one or more NGAs 200,200' in response to the load balancing of the IP packets.

Next at process block 908, the IP packets are processed and a plurality of netflow records (NFR) 503A-503N are generated by one or more netflow generators (NG) 502A-502N in the one or more netflow generation appliances (NGA) 200,200' in response to distribution of IP packets.

Next at process block 912, the netflow records are prepared for sending to a plurality of netflow collectors. Selective load balancing is performed in the netflow generation appliance to selectively distribute the netflow records to the plurality of netflow collectors. In one embodiment, the netflow records may be load balanced by generating hash tags and selectively filtrating over the hash tag values. In some embodiments, the netflow records may be load balanced by using the hash tags and a sorted table.

Next at process block 914, the netflow records are distributed to a plurality of netflow collectors in response to the load balancing of the netflow records.

At process block 916, net flow data is collected together in the plurality of netflow collectors regarding the netflow records in response to one or more selected network parameters (e.g., port address).

Next at process block 918, all netflow data from the plurality of netflow collections is centrally collected together by a central netflow collector.

At process block 920, the centrally collected netflow data is routed to an analyzer.

At process block 922, the centrally collected net flow data is analyzed and presented to a user. One or more of the processes of the methods can be repeated over and over again as the data center is active. If shutdown, the process may end at process block 999.

Figure 10A:
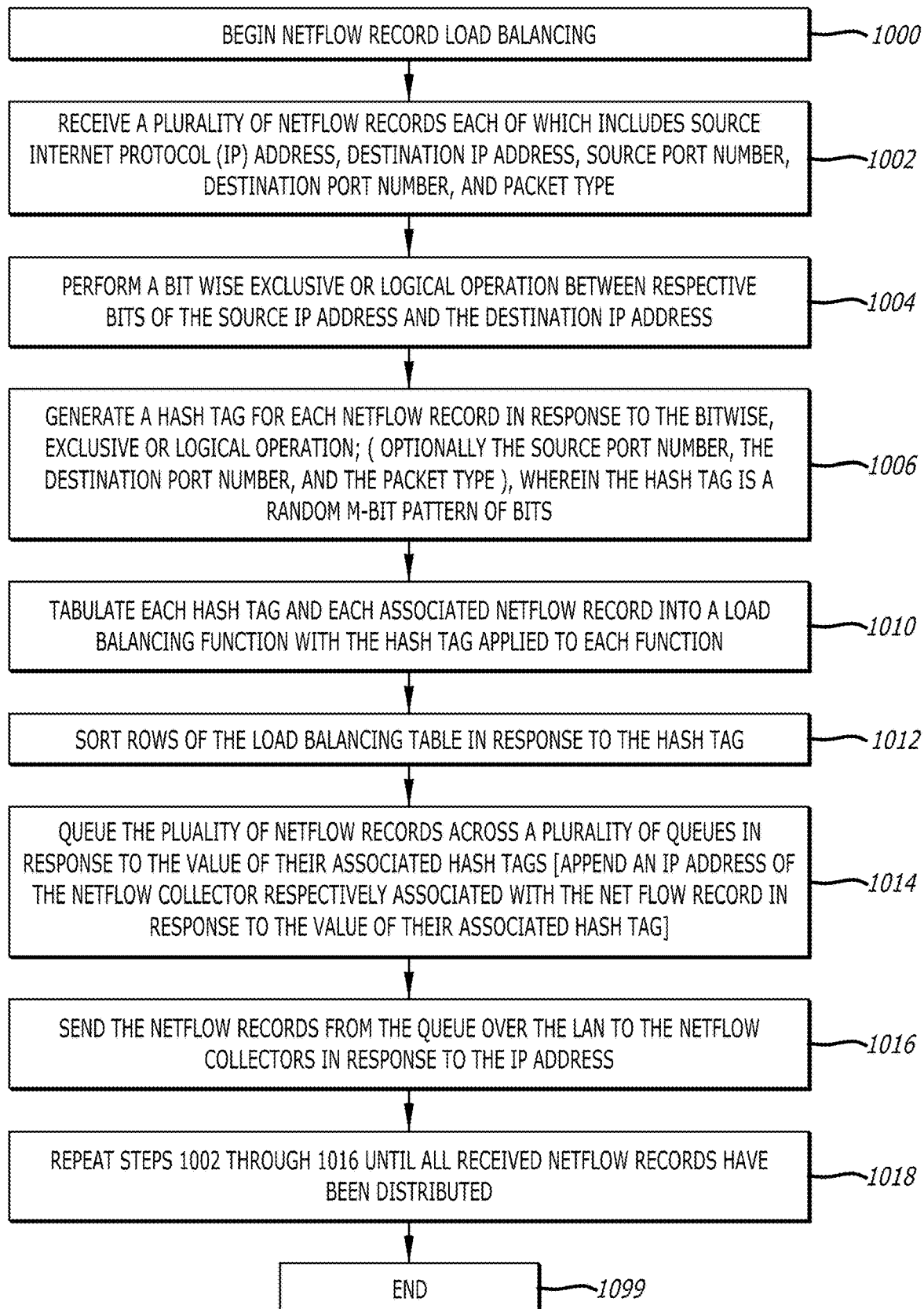
FIGS. 10A-10B illustrates flow charts of methods of load balancing netflow records.

FIG. 10A is a flowchart of a method load balancing netflow records with a load balancing table, according to one embodiment. The process begins at process block 1000 and goes to process block 1002.

At process block 1002, a plurality of netflow records are generated and/or received. Each netflow record includes a source internet protocol (IP) address, a destination IP address, a source port number, a destination port number, and a packet type.

At process block 1004, a bit wise exclusive or logical operation is performed between respective bits of the source IP address and the destination IP address.

Next at process block 1006, a hash tag, is generated for each netflow record in response to the bitwise exclusive-or (XOR) logical operation. The hash tag is a randomized number of the bitwise exclusive or logical operation. Optionally, the source port number, the destination port number, and the packet type may be further used to generate the randomized hash tag value. In any case, the hash tag is a random pattern of M-bits, where M is a predetermined number of bits. A cyclic redundancy check generator of M-bits wide may be used to generate the hash tag. Otherwise, a random number generator seeded by the result of the bitwise exclusive or logical operation may be used to generate the hash tag value for a given netflow record.

Next at process block 1010, each hash tag and information associated with each netflow record is tabulated into a load balancing table in response to a load balancing function.

Next at process block 1012, each hash tag value operates as an identifier for each set of records in the load balancing table.

Next at process block 1014, a plurality of netflow records from the load balancing table are queued up across a plurality of queues in response to the value of their associated hash tags. Each queue is associated with a net flow collector. Accordingly, an IP address of the netflow collector is respectively associated with the net flow record. The IP address of the netflow collector is appended as the destination address of the Ethernet packet that is to transmit the netflow record to the netflow collector, in response to the value of the associated hash tag.

Next at process block 1016, netflow records from a queue are packetized into an Ethernet packet and sent from the queue over the local area network connections to the netflow collectors in response to the netflow collect IP address.

At process block 1018, processes of process blocks 1022 through 10016 may be repeated over an over again until all received netflow records have been distributed, the system is shut off, or the process otherwise ends at process block 1099.

Figure 10B:
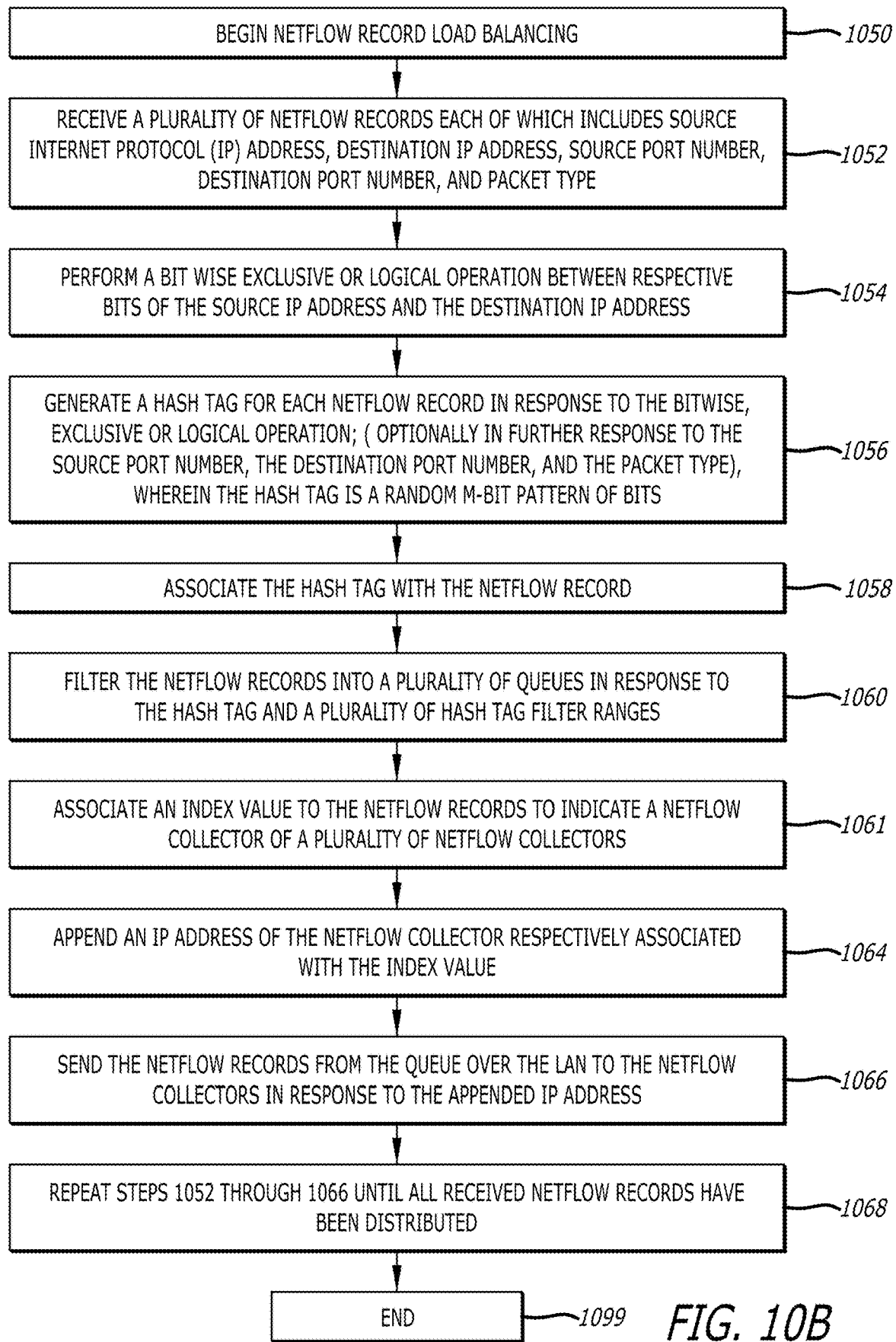

Referring now to FIG. 10B, a flowchart of a method load balancing netflow records with a filter function is shown. The process begins with process block 1050 and goes to process block 1052.

At process block 1052, one or more netflow records are received each of which includes a source internet protocol (IP) address, a destination IP address, a source port number, a destination port number, and a packet type.

Next at process block 1054, a bit wise exclusive or logical operation between respective bits of the source IP address and the destination IP address is performed.

At process block 1056, a hash tag value is generated for the one or more netflow records in response to the bitwise exclusive-or (XOR) logical operation. The hash tag is a random m-bit pattern of bits. The results of the bitwise exclusive-or (XOR) logical operation is randomized by a hash tag generator to form the hash tag value. The hash tag generator may be a cyclic redundancy check (CRC) generator. The hash tag value may be generated for the one or more netflow records in further response to the source port number, the destination port number, and the packet type.

Next at process block 1058, the hash tag value is associated with the netflow record.

At process block 1060, the netflow records are filtered by a filter function into a plurality of queues in response to the hash tag and a plurality of hash tag filter ranges.

At process block 1062, an index value may be associated with the netflow records to indicate the netflow collector of a plurality of netflow collectors that is to receive the netflow record.

At process block 1064, the IP address of the netflow collector is appended to an Ethernet packet. The net flow records with the index value associated with the netflow collector are packetized into the Ethernet packet.

At process block 1066, the netflow records are sent from the queues over the LAN in the Ethernet packets to the netflow collectors in response to the IP address.

At block 1068, steps 1052 through 1066 may be repeated over and over again until all received netflow records have been distributed, the system is shut off, or the process otherwise ends at process block 1099.

Netflow Record Analysis

Figure 12:
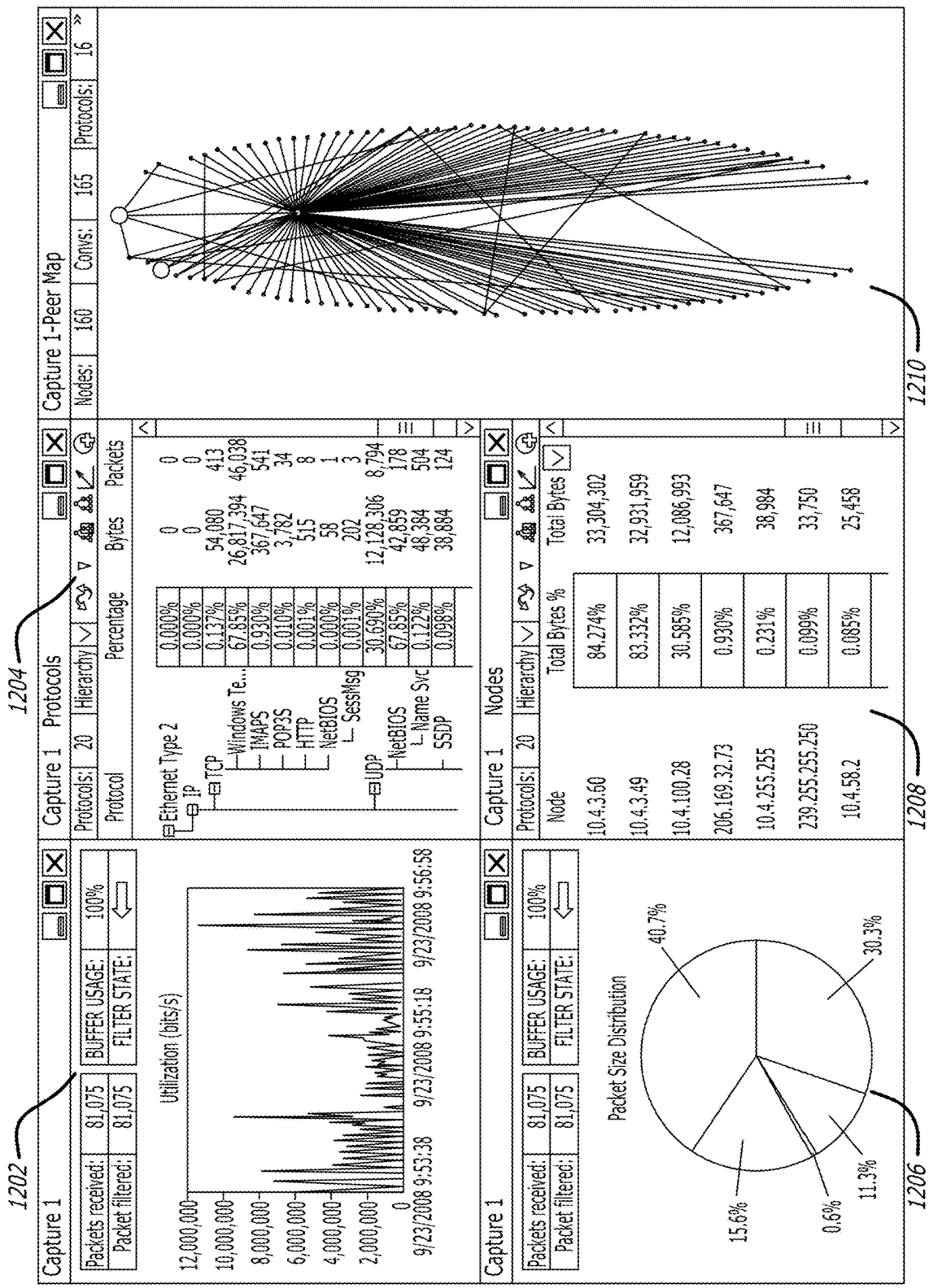
FIG. 12 illustrates windows of an exemplary netflow record analysis.

FIG. 12 is a screenshot of an example graphical user interface window of netflow record analysis that may be performed by analyzer 156L of FIG. 1A. The presentations of five resources in a dashboard configuration allow the user a single screen viewpoint of the major elements analyzed from the netflow records flowing through the system. The user interface window illustrates the packets received and packets filtered 1202, the packet protocols processed 1204, and the packet size distribution 1206. The user interface window further illustrates the IP address nodes and the total bytes per node processed 1208. The user interface window further shows a graphical representation of the entire traffic flow, by IP address, showing the to and from relationship per IP address 1210.

Other graphical user interface windows for netflow record analysis can be generated by software, such as that shown and described in U.S. Provisional Patent Application No. 61/973,828, entitled "HASH TAG LOAD BALANCING" filed on Apr. 1, 2014 by inventors Karsten Benz et al., incorporated herein by reference. For example, a graphical user interface window of netflow record analysis may be used to show the total netflow records received, traffic breakdown over a given timeframe, the applications detected flowing through the system by application type and the amount of bandwidth impact per application, top resources as measured by the packet flow as a volume measurement of total packets processed, a threat analysis by color coding the respective line in red for a possible or suspected network threat, and a timeframe of comparisons of the impact of bursts of bandwidth downloads and their impact on available bandwidth.

Various specific materials, designs, dimensions, etc. are provided and are considered highly beneficial embodiments of the present disclosure. However, such specifics are also merely illustrative of broader aspects of the present disclosure and should not be considered to necessarily limit such broader aspects unless expressly specified to be required.

When implemented in software, elements of the embodiments are essentially the code segments or instructions to perform the functional tasks described herein. The code segments or instructions are executable by a processor, such as CPU 202 illustrated in FIG. 2, and can be stored in a storage device or a processor readable storage medium, such as storage device 201 or memory 204 illustrated in FIG. 2, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, a hard disk. The code segments or instructions may be downloaded via computer networks such as the Internet, Intranet, etc. into the processor readable storage medium.

Various combinations and sub-combinations, and modifications as may be made, of the presently disclosed components and embodiments and aspects are contemplated whether or not specifically disclosed, to the extent and as would be apparent to one of ordinary skill based upon review of this disclosure and in order to suit a particular intended purpose or application.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A netflow generator appliance, comprising:
a memory device storing one or more load balancing functions; and
a processor coupled to the memory device and configured to perform operations, including:
receiving a plurality of netflow records at the netflow generator appliance,
generating a hash tag for each netflow record,
converting a first hash tag of the first netflow record into a first percentage based on a load balancing function,
based on the first percentage, storing the first netflow record in a first queue of data that are scheduled to be sent to a first netflow collector,
converting a second hash tag of a second netflow record into a second percentage based on the load balancing function, wherein the second percentage differs from the first percentage, and
based on the second percentage, storing the second netflow record in a second queue of data that are scheduled to be sent to a second netflow collector, wherein the first netflow collector and the second netflow collector are coupled to a central netflow collector, which centrally collects netflow records from the first netflow collector and the second netflow collector and centrally routes the netflow records to a remote analyzer tool and a remote management console including a monitor and a keyboard.

2. The netflow generator appliance of claim 1, wherein the hash tag is a random M-bit pattern of bits.

3. The netflow generator appliance of claim 1, wherein each netflow record further includes a source port number, a destination port number, and a packet type.

4. A system comprising:
a first netflow collector;
a second netflow collector;

a netflow generator appliance coupled to the first netflow collector and the second netflow collector, the netflow generator appliance including a memory device storing one or more load balancing functions, and a processor coupled to the memory device and configured to perform operations, including receiving a plurality of netflow records at the netflow generator appliance, generating a hash tag for each netflow record, converting a first hash tag of the first netflow record into a first percentage based on a load balancing function, based on the first percentage, storing the first netflow record in a first queue of data that are scheduled to be sent to the first netflow collector, converting a second hash tag of a second netflow record into a second percentage based on the load balancing function, wherein the second percentage differs from the first percentage, and based on the second percentage, storing the second netflow record in a second queue of data that are scheduled to be sent to the second netflow collector;

a central netflow collector coupled to the first netflow collector and the second netflow collector, the central netflow collector adapted to centrally collect the netflow records from the first netflow collector and the second netflow collector;

a local analyzer tool coupled to the central netflow collector, the local analyzer tool adapted to receive the centrally collected netflow records; and a local management console coupled to the local analyzer tool, the local management console including a keyboard and a monitor adapted to control the local analyzer tool to analyze the centrally collected netflow records.

5. The system of claim 4, wherein
the hash tag is a random M-bit pattern of bits.

6. The system of claim 4, wherein
each netflow record further includes a source port number, a destination port number, and a packet type.

* * * * *